US009967246B2

United States Patent
Beckhardt et al.

(10) Patent No.: US 9,967,246 B2
(45) Date of Patent: May 8, 2018

(54) CLOUD QUEUE ACCESS CONTROL

(71) Applicant: Sonos, Inc., Santa Barbara, CA (US)

(72) Inventors: Steven Beckhardt, Boston, MA (US); Andrew J. Schulert, Cambridge, MA (US); Gregory Ramsperger, Somerville, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days. days.

(21) Appl. No.: 15/288,754

(22) Filed: Oct. 7, 2016

(65) Prior Publication Data

US 2017/0026430 A1    Jan. 26, 2017

Related U.S. Application Data

(63) Continuation of application No. 14/616,310, filed on Feb. 6, 2015, now Pat. No. 9,537,852.

(Continued)

(51) Int. Cl.
*G06F 17/00* (2006.01)
*H04L 29/06* (2006.01)
(Continued)

(52) U.S. Cl.
CPC .......... *H04L 63/08* (2013.01); *G05B 15/02* (2013.01); *G06F 3/16* (2013.01); *G06F 3/165* (2013.01);
(Continued)

(58) Field of Classification Search
CPC ......... G06F 17/30017; G06F 17/30053; G06F 17/3074; G06F 3/0482; G06F 3/165;
(Continued)

(56) References Cited

U.S. PATENT DOCUMENTS 5,440,644 A    8/1995    Farinelli et al.
5,761,320 A    6/1998    Farinelli et al.
(Continued)

FOREIGN PATENT DOCUMENTS

EP    1389853 A1    2/2004
EP    2779529 A1    9/2014
(Continued)

OTHER PUBLICATIONS

Advisory Action dated Jan. 12, 2017, issued in connection with U.S. Appl. No. 14/475,093, filed Sep. 2, 2014, 11 pages.
(Continued)

*Primary Examiner* — Andrew C Flanders
(74) *Attorney, Agent, or Firm* — McDonnell Boehnen Hulbert & Berghoff LLP

(57) ABSTRACT

Techniques relate to a cloud queue facilitating access to a cloud queue via an authorization token. In an example implementation, a computing system receives, over a network interface from a media playback system, an authorization token corresponding to a cloud queue of media items at the computing system and a request by the media playback system for access to the cloud queue of media items. The computing system determines that the authorization token is valid and in response to the determination, provides, to the media playback system, the requested access to the cloud queue of media items, the providing comprising transmitting information associated with at least one of the media items of the cloud queue. Thereafter, the computing system determines that the media playback system is eligible for a renewed authorization token and, in response, transmits, to the media playback system, the renewed authorization token.

20 Claims, 15 Drawing Sheets

Related U.S. Application Data

(60) Provisional application No. 62/007,906, filed on Jun. 4, 2014.

(51) Int. Cl.

| | | |
|---|---|---|
| *H04L 29/08* | (2006.01) | |
| *G06F 3/16* | (2006.01) | |
| *G05B 15/02* | (2006.01) | |
| *G06F 17/30* | (2006.01) | |
| *H04H 60/80* | (2008.01) | |
| *H04L 12/24* | (2006.01) | |
| *H04R 27/00* | (2006.01) | |
| *H04N 21/258* | (2011.01) | |
| *H04N 21/262* | (2011.01) | |
| *H04N 21/432* | (2011.01) | |
| *H04N 21/436* | (2011.01) | |
| *H04N 21/482* | (2011.01) | |
| *H04N 21/6377* | (2011.01) | |
| *H04N 21/654* | (2011.01) | |
| *H04N 21/658* | (2011.01) | |
| *H04N 21/81* | (2011.01) | |
| *H04N 21/845* | (2011.01) | |

(52) U.S. Cl.
CPC ....... *G06F 17/30058* (2013.01); *H04H 60/80* (2013.01); *H04L 41/22* (2013.01); *H04L 63/105* (2013.01); *H04L 65/1003* (2013.01); *H04L 65/4069* (2013.01); *H04L 65/4084* (2013.01); *H04L 65/60* (2013.01); *H04L 65/602* (2013.01); *H04L 65/608* (2013.01); *H04L 67/10* (2013.01); *H04L 67/1095* (2013.01); *H04L 67/12* (2013.01); *H04L 67/325* (2013.01); *H04N 21/25816* (2013.01); *H04N 21/26258* (2013.01); *H04N 21/4325* (2013.01); *H04N 21/43615* (2013.01); *H04N 21/4825* (2013.01); *H04N 21/6377* (2013.01); *H04N 21/654* (2013.01); *H04N 21/658* (2013.01); *H04N 21/8113* (2013.01); *H04N 21/8455* (2013.01); *H04R 27/00* (2013.01); *H04R 2227/005* (2013.01)

(58) Field of Classification Search
CPC .. G06F 3/16; H04N 21/4307; H04N 21/4825; H04N 21/42204; H04N 21/43615; H04L 12/2805; H04L 12/282; H04L 2015/2841; H04L 2015/2849; H04L 63/08
See application file for complete search history.

(56) References Cited

U.S. PATENT DOCUMENTS

| | | | |
|---|---|---|---|
| 5,923,902 A | | 7/1999 | Inagaki |
| 6,032,202 A | | 2/2000 | Lea et al. |
| 6,256,554 B1 | | 7/2001 | DiLorenzo |
| 6,404,811 B1 | | 6/2002 | Cvetko et al. |
| 6,469,633 B1 | | 10/2002 | Wachter |
| 6,522,886 B1 | | 2/2003 | Youngs et al. |
| 6,587,127 B1 | | 7/2003 | Leeke et al. |
| 6,611,537 B1 | | 8/2003 | Edens et al. |
| 6,631,410 B1 | | 10/2003 | Kowalski et al. |
| 6,757,517 B2 | | 6/2004 | Chang |
| 6,778,869 B2 | | 8/2004 | Champion |
| 6,934,269 B1 | | 8/2005 | Hasha et al. |
| 7,130,608 B2 | | 10/2006 | Hollstrom et al. |
| 7,130,616 B2 | | 10/2006 | Janik |
| 7,143,939 B2 | | 12/2006 | Henzerling |
| 7,236,773 B2 | | 6/2007 | Thomas |
| 7,295,548 B2 | | 11/2007 | Blank et al. |
| 7,391,791 B2 | | 6/2008 | Balassanian et al. |
| 7,483,538 B2 | | 1/2009 | McCarty et al. |
| 7,571,014 B1 | | 8/2009 | Lambourne et al. |
| 7,630,501 B2 | | 12/2009 | Blank et al. |
| 7,643,894 B2 | | 1/2010 | Braithwaite et al. |
| 7,657,910 B1 | | 2/2010 | McAulay et al. |
| 7,797,446 B2 | | 9/2010 | Heller et al. |
| 7,805,682 B1 | | 9/2010 | Lambourne |
| 7,827,259 B2 | | 11/2010 | Heller et al. |
| 7,853,341 B2 | | 12/2010 | McCarty et al. |
| 7,958,441 B2 | | 6/2011 | Heller et al. |
| 7,987,294 B2 | | 7/2011 | Bryce et al. |
| 8,014,423 B2 | | 9/2011 | Thaler et al. |
| 8,045,952 B2 | | 10/2011 | Qureshey et al. |
| 8,103,009 B2 | | 1/2012 | McCarty et al. |
| 8,204,890 B1 | | 6/2012 | Gogan |
| 8,234,395 B2 | | 7/2012 | Millington et al. |
| 8,370,952 B1 * | | 2/2013 | Wieder ............... G06F 21/10 726/26 |
| 8,483,853 B1 | | 7/2013 | Lambourne |
| 8,516,093 B2 | | 8/2013 | Bank |
| 8,818,538 B2 | | 8/2014 | Sakata |
| 8,942,252 B2 | | 1/2015 | Balassanian et al. |
| 9,226,013 B2 | | 12/2015 | Fishwick |
| 9,286,384 B2 | | 3/2016 | Kuper et al. |
| 9,363,254 B2 | | 6/2016 | Beckhardt et al. |
| 9,363,255 B2 | | 6/2016 | Coburn, IV |
| 9,374,607 B2 | | 6/2016 | Bates et al. |
| 9,537,852 B2 * | | 1/2017 | Beckhardt ............... H04L 65/60 |
| 9,648,070 B2 | | 5/2017 | Beckhardt et al. |
| 9,654,459 B2 | | 5/2017 | Coburn, IV et al. |
| 2001/0042107 A1 | | 11/2001 | Palm |
| 2002/0022453 A1 | | 2/2002 | Balog et al. |
| 2002/0026442 A1 | | 2/2002 | Lipscomb et al. |
| 2002/0124097 A1 | | 9/2002 | Isely et al. |
| 2003/0157951 A1 | | 8/2003 | Hasty |
| 2004/0024478 A1 | | 2/2004 | Hans et al. |
| 2004/0139222 A1 | | 7/2004 | Slik et al. |
| 2004/0215611 A1 | | 10/2004 | Jawa et al. |
| 2005/0240661 A1 | | 10/2005 | Heller et al. |
| 2007/0038999 A1 | | 2/2007 | Millington et al. |
| 2007/0129005 A1 | | 6/2007 | Goldberg et al. |
| 2007/0142944 A1 | | 6/2007 | Goldberg et al. |
| 2007/0219910 A1 | | 9/2007 | Martinez |
| 2008/0177822 A1 | | 7/2008 | Yoneda |
| 2008/0229215 A1 | | 9/2008 | Baron et al. |
| 2009/0087167 A1 | | 4/2009 | Seisun et al. |
| 2009/0249222 A1 | | 10/2009 | Schmidt et al. |
| 2010/0075313 A1 | | 3/2010 | Kreuwel et al. |
| 2010/0281178 A1 * | | 11/2010 | Sullivan ............... H04N 7/24 709/231 |
| 2011/0004330 A1 | | 1/2011 | Rothkopf et al. |
| 2011/0040658 A1 | | 2/2011 | Gautier et al. |
| 2011/0058675 A1 | | 3/2011 | Brueck et al. |
| 2011/0161485 A1 | | 6/2011 | George et al. |
| 2011/0307927 A1 | | 12/2011 | Nakano et al. |
| 2012/0005380 A1 | | 1/2012 | Batson et al. |
| 2012/0088477 A1 | | 4/2012 | Cassidy |
| 2012/0089910 A1 | | 4/2012 | Cassidy |
| 2012/0290932 A1 | | 11/2012 | Johnson |
| 2012/0321087 A1 * | | 12/2012 | Fleischman ............ H04L 9/3213 380/279 |
| 2012/0324552 A1 * | | 12/2012 | Padala ................... H04L 9/3213 726/6 |
| 2013/0073584 A1 | | 3/2013 | Kuper et al. |
| 2013/0174204 A1 | | 7/2013 | Coburn, IV et al. |
| 2013/0188924 A1 | | 7/2013 | Morris |
| 2013/0219178 A1 | | 8/2013 | Xiques et al. |
| 2013/0253679 A1 | | 9/2013 | Lambourne |
| 2013/0317635 A1 | | 11/2013 | Bates et al. |
| 2013/0326041 A1 | | 12/2013 | Bellet et al. |
| 2014/0074959 A1 | | 3/2014 | Alsina et al. |
| 2014/0075308 A1 | | 3/2014 | Sanders et al. |
| 2014/0075513 A1 | | 3/2014 | Trammel et al. |
| 2014/0094943 A1 | | 4/2014 | Bates et al. |
| 2014/0123006 A1 | | 5/2014 | Chen et al. |
| 2014/0181107 A1 | | 6/2014 | Coburn, IV et al. |
| 2014/0181655 A1 | | 6/2014 | Kumar et al. |
| 2014/0189648 A1 | | 7/2014 | Everitt |

(56) References Cited

U.S. PATENT DOCUMENTS

| | | | |
|---|---|---|---|
| 2014/0282772 | A1 | 9/2014 | Chen et al. |
| 2014/0310316 | A1 | 10/2014 | Coburn, IV et al. |
| 2015/0098576 | A1 | 4/2015 | Sundaresan et al. |

FOREIGN PATENT DOCUMENTS

| | | | |
|---|---|---|---|
| JP | 2002044765 A | 2/2002 | |
| JP | 2006524874 A | 11/2006 | |
| JP | 2007264922 A | 10/2007 | |
| JP | 2013247591 A | 12/2013 | |
| JP | 2016537873 A | 12/2016 | |
| WO | 200153994 | 7/2001 | |
| WO | 2003093950 A2 | 11/2003 | |
| WO | 2012115742 | 8/2012 | |
| WO | 2012137190 A1 | 10/2012 | |
| WO | 2013043958 A2 | 3/2013 | |
| WO | 2014004181 A1 | 1/2014 | |
| WO | 2014039163 | 3/2014 | |
| WO | 2015031703 A1 | 3/2015 | |

OTHER PUBLICATIONS

Corrected Notice of Allowability dated Nov. 29, 2016, issued in connection with U.S. Appl. No. 14/616,310, filed Feb. 6, 2015, 6 pages.
International Bureau, International Preliminary Report on Patentability dated Dec. 15, 2016, issued in connection with International Application No. PCT/US2015/031756, filed on May 20, 2015, 9 pages.
International Bureau, International Preliminary Report on Patentability dated Dec. 15, 2016, issued in connection with International Application No. PCT/US2015/031930, filed on May 21, 2015, 9 pages.
International Bureau, International Preliminary Report on Patentability dated Dec. 15, 2016, issued in connection with International Application No. PCT/US2015/033003, filed on May 28, 2015, 17 pages.
International Bureau, International Preliminary Report on Patentability dated Dec. 15, 2016, issued in connection with International Application No. PCT/US2015/033008, filed on May 28, 2015, 16 pages.
"Denon 2003-2004 Product Catalog," Denon, 2003-2004, 44 pages.
Notice of Allowance dated Dec. 1, 2016, issued in connection with U.S. Appl. No. 14/616,341, filed Feb. 6, 2015, 5 pages.
Notice of Allowance dated Jan. 3, 2017, issued in connection with U.S. Appl. No. 15/099,846, filed Apr. 15, 2016, 5 pages.
Notice of Allowance dated Jan. 3, 2017, issued in connection with U.S. Appl. No. 15/130,672, filed Apr. 15, 2016, 5 pages.
Notice of Allowance dated Jan. 5, 2017, issued in connection with U.S. Appl. No. 14/616,332, filed Feb. 6, 2015, 5 pages.
Notice of Allowance dated Nov. 23, 2016, issued in connection with U.S. Appl. No. 14/485,602, filed Sep. 12, 2014, 9 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Corrected Notice of Allowability dated Aug. 25, 2016, issued in connection with U.S. Appl. No. 14/616,332, filed Feb. 6, 2015, 2 pages.
Dell, Inc. "Dell Digital Audio Receiver: Reference Guide," Jun. 2000, 70 pages.
Dell, Inc. "Start Here," Jun. 2000, 2 pages.
Final Office Action dated Nov. 3, 2016, issued in connection with U.S. Appl. No. 14/616,319, filed Feb. 6, 2015, 23 pages.
Final Office Action dated Oct. 3, 2016, issued in connection with U.S. Appl. No. 14/616,341, filed Feb. 6, 2015, 18 pages.
Final Office Action dated Oct. 19, 2016, issued in connection with U.S. Appl. No. 14/475,093, filed Sep. 2, 2014, 30 pages.
First Action Interview Office Action dated Jun. 10, 2016, issued in connection with U.S. Appl. No. 14/616,319, filed Feb. 6, 2015, 7 pages.
First Action Interview Office Action dated Aug. 18, 2016, issued in connection with U.S. Appl. No. 14/485,602, filed Sep. 12, 2014, 15 pages.
International Searching Authority, International Search Report and Written Opinion dated Sep. 7, 2015, issued in connection with International Application No. PCT/US2015/033008, filed on May 28, 2015, 19 pages.
International Searching Authority, International Search Report and Written Opinion dated Aug. 12, 2015, issued in connection with International Application No. PCT/US2015/031930, filed on May 21, 2015, 12 pages.
International Searching Authority, International Search Report and Written Opinion dated Jul. 20, 2015, issued in connection with International Application No. PCT/US2015/031756, filed on May 20, 2015, 12 pages.
International Searching Authority, International Search Report and Written Opinion dated Aug. 27, 2015, issued in connection with International Application No. PCT/US2015/033003, filed on May 28, 2015, 20 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Sep. 12, 2016, issued in connection with U.S. Appl. No. 14/475,093, filed Sep. 2, 2014, 26 pages.
Non-Final Office Action dated Oct. 17, 2016, issued in connection with U.S. Appl. No. 15/099,846, filed Aug. 15, 2016, 6 pages.
Non-Final Office Action dated Sep. 23, 2016, issued in connection with U.S. Appl. No. 15/130,672, filed Apr. 15, 2016, 6 pages.
Notice of Allowance dated Jul. 1, 2016, issued in connection with U.S. Appl. No. 14/616,310, filed Feb. 6, 2015, 9 pages.
Notice of Allowance dated Apr. 7, 2016, issued in connection with U.S. Appl. No. 14/616,325, filed Feb. 6, 2015, 5 pages.
Notice of Allowance dated Apr. 8, 2016, issued in connection with U.S. Appl. No. 14/616,364, filed Feb. 6, 2015, 6 pages.
Notice of Allowance dated Jul. 18, 2016, issued in connection with U.S. Appl. No. 14/616,332, filed Feb. 6, 2015, 7 pages.
Palm, Inc., "Handbook for the Palm VII Handheld," May 2000, 311 pages.
Pre-Interview First Office Action dated Apr. 6, 2016, issued in connection with U.S. Appl. No. 14/616,341, filed Feb. 6, 2015, 4 pages.
Preinterview First Office Action dated Jul. 15, 2016, issued in connection with U.S. Appl. No. 14/485,602, filed Sep. 12, 2014, 6 pages.
Preinterview First Office Action dated Apr. 20, 2016, issued in connection with U.S. Appl. No. 14/616,310, filed Feb. 6, 2015, 21 pages.

(56) References Cited

OTHER PUBLICATIONS

Preinterview First Office Action dated Apr. 21, 2016, issued in connection with U.S. Appl. No. 14/616,332, filed Feb. 6, 2015, 20 pages.
Pre-Interview First Office Action dated Feb. 23, 2016, issued in connection with U.S. Appl. No. 14/616,364, filed Feb. 6, 2015, 5 pages.
Pre-Interview First Office Action dated Feb. 24, 2016, issued in connection with U.S. Appl. No. 14/616,325, filed Feb. 6, 2015, 5 pages.
Pre-Interview First Office Action dated Mar. 29, 2016, issued in connection with U.S. Appl. No. 14/616,319, filed Feb. 6, 2015, 5 pages.
Presentations at WinHEC 2000, May 2000, 138 pages.
UPnP; "Universal Plug and Play Device Architecture," Jun. 8, 2000; version 1.0; Microsoft Corporation; pp. 1-54.
European Patent Office, European Extended Search Report dated Jul. 19, 2017, issued in connection with EP Application No. 15803347.2, 14 pages.
European Patent Office, European Extended Search Report dated Jul. 27, 2017, issued in connection with EP Application No. 15802676.5, 12 pages.
European Patent Office, European Extended Search Report dated Jul. 28, 2017, issued in connection with EP Application No. 15803358.9, 14 pages.
European Patent Office, European Supplemental Search Report dated Sep. 20, 2017, issued in connection with EP Application No. 158032227, 11 pages.
Final Office Action dated Aug. 16, 2017, issued in connection with U.S. Appl. No. 14/475,093, filed Sep. 2, 2014, 16 pages.
Japanese Patent Office, Office Action dated May 9, 2017, issued in connection with Japanese Patent Application No. 2016-570965, 7 pages.
Japanese Patent Office, Office Action dated Jun. 13, 2017, issued in connection with Japanese patent application No. 2016-571113, 5 pages.
Japanese Patent Office, Translation of Office Action dated May 9, 2017, issued in connection with Japanese Patent Application No. 2016-570965, 4 pages.
Japanese Patent Office, Translation of Office Action dated Jun. 13, 2017, issued in connection with Japanese Patent Application No. 2016-571113, 2 pages.
Non-Final Office Action dated Feb. 1, 2017, issued in connection with U.S. Appl. No. 14/616,319, filed Feb. 6, 2015, 26 pages.
Non-Final Office Action dated May 1, 2017, issued in connection with U.S. Appl. No. 14/475,093, filed Sep. 2, 2014, 10 pages.
Non-Final Office Action dated Jul. 10, 2017, issued in connection with U.S. Appl. No. 15/477,912, filed Apr. 3, 2017, 7 pages.
Notice of Allowance dated Mar. 10, 2017, issued in connection with U.S. Appl. No. 14/616,341, filed Feb. 6, 2015, 5 pages.
Notice of Allowance dated May 17, 2017, issued in connection with U.S. Appl. No. 14/616,319, filed Feb. 6, 2015, 9 pages.
Notice of Allowance dated Mar. 20, 2017, issued in connection with U.S. Appl. No. 14/485,602, filed Sep. 12, 2014, 9 pages.
Seong et al. PrPl Mobile Cloud Computing and Services: Social Networks and Beyond (MCS), Jun. 15, 2010, 8 pages.

* cited by examiner

| PLAYBACK QUEUE | |
|---|---|
| MEDIA ITEM | POSITION |
| Song A | 1 |
| Song B | 2 |
| Song C | 3 |
| Song D | 4 |
| Song E | 5 |
| Song F | 6 |
| Song G | 7 |
| Song H | 8 |
| Song I | 9 |
| Song J | 10 |
| Song K | 11 |
| Song L | 12 |
| Song M | 13 |
| Song N | 14 |
| Song O | 15 |
| Song P | 16 |

CLOUD QUEUE ACCESS CONTROL

CROSS REFERENCE TO RELATED APPLICATIONS

This application claims priority under 35 U.S.C. § 120 to, and is a continuation of, U.S. Non-Provisional patent application Ser. No. 14/616,310 filed on Feb. 6, 2015, which is incorporated herein in its entirety. U.S. Non-Provisional patent application Ser. No. 14/616,310 claims priority to U.S. Provisional Patent Application Ser. No. 62/007,906 filed Jun. 4, 2014, entitled "Cloud Queue," which is also incorporated herein in its entirety.

This application is related to the following applications filed on the same day as U.S. Non-Provisional patent application Ser. No. 14/616,310, the contents of each are incorporated by reference herein: entitled "Cloud Queue Access Control," U.S. application Ser. No. 14/616,319 filed Feb. 6, 2015; entitled "Cloud Queue Access Control," U.S. application Ser. No. 14/616,325 filed Feb. 6, 2015; entitled "Cloud Queue Sync Protocol," U.S. application Ser. No. 14/616,332 filed Feb. 6, 2015; entitled "Cloud Queue Playback Policy," U.S. application Ser. No. 14/616,341 filed Feb. 6, 2015; and entitled "Cloud Queue Playhead," U.S. application Ser. No. 14/616,364 filed Feb. 6, 2015.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 7 is an example playback queue;

Figure 1:
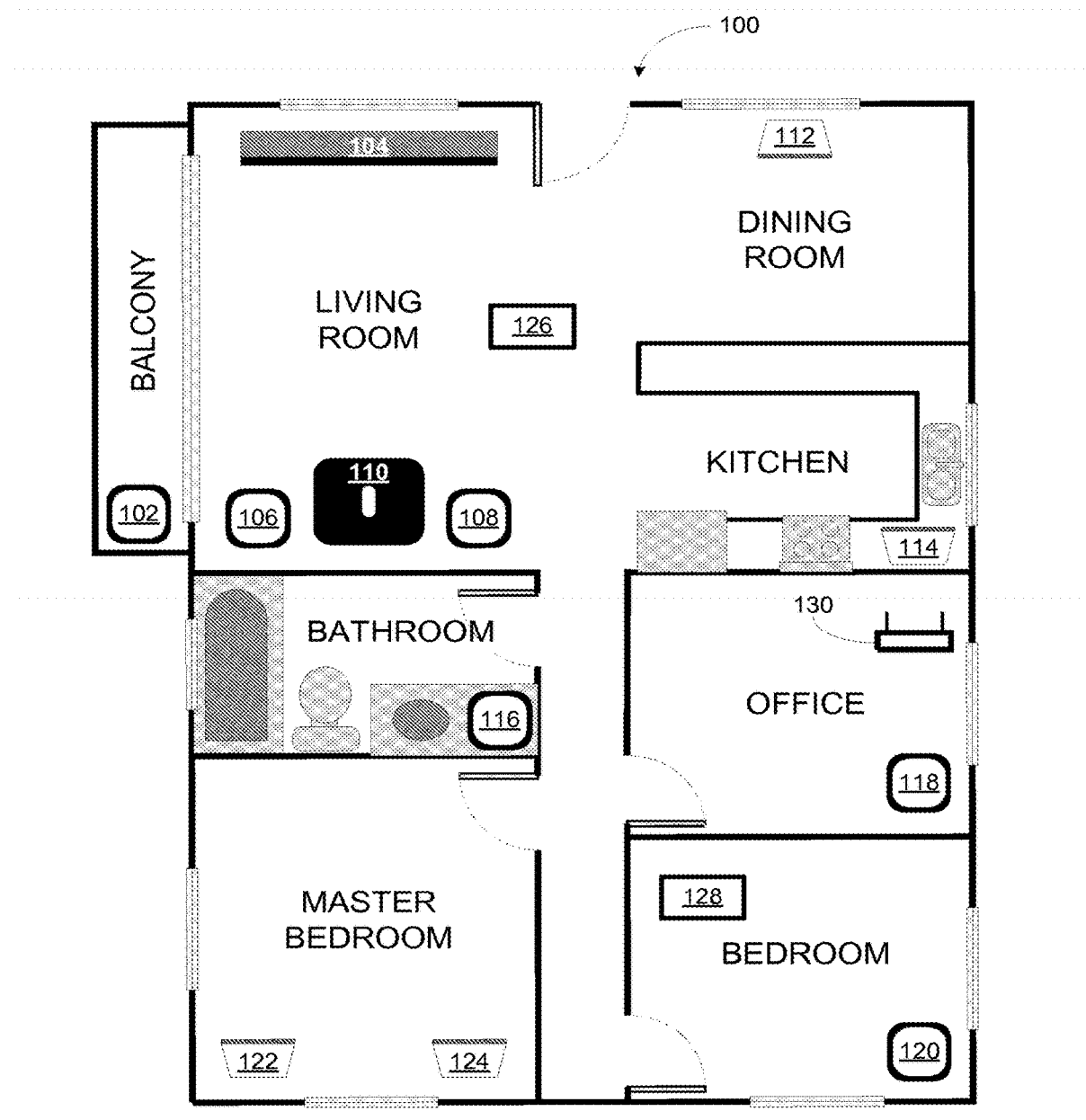
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Embodiments described herein may involve, inter alia, controlling access to a cloud-based playback queue ("cloud queue"). In some embodiments, a computing system may maintain or have access to a cloud queue of media items. Such a computing system may assist in providing a cloud service. One aspect of the cloud service may involve providing a media playback system (or multiple media playback systems) access to the cloud queue. Access to the cloud queue may involve a variety of operations with respect to cloud queue. For instance, access to the queue may involve playback of the queue by a media playback system (perhaps in synchrony with other media playback systems) or modifications to the queue (perhaps by adding or removing media items or by modifying the ordering of the media items). When access to a cloud queue is controlled, certain entities might be permitted to access the cloud queue, while other entities might be prohibited.

Some example techniques may involve controlling access to a cloud queue based on the identity of the entity that is accessing the cloud queue. For instance, controlling access to a given cloud queue may involve authenticating certain media playback systems to access the cloud queue (and perhaps prohibiting other media playback systems from accessing the cloud queue). Alternatively, certain user accounts (accounts) may be authenticated to access the cloud queue, perhaps by way of a device that is associated with the account. For example, an account that is associated with a given device of a media playback system may access the cloud queue by way of the device. As another example, controlling access to a given cloud queue may involve authenticating certain a certain device (or group of devices) of a media playback system to access the cloud queue.

A mechanism to control access to a cloud queue may include use of one or more authentication tokens. For instance, an authentication token may authenticate the entity bearing the token to access the cloud queue. A host of a cloud queue (e.g., a remote computing system) may restrict access to entities having a valid authentication token. The entity might be a media playback system, a device (or group of devices), or a user account, among other examples. In some cases, a given authentication token might authenticate an entity with general access rights. In other cases, an authentication token might authenticate the entity with session-specific rights that authenticate the entity for the duration of a given session.

In some examples, a host of a cloud queue may restrict entities to one of two or more different levels or types of access. For instance, the host may grant a first type of access to a first entity (e.g., a media playback system) and a second type of access to a second entity (e.g., another media playback system). In some embodiments, the first type of access and the second type of access may include "read" access and "full" access, respectively. Full access may authenticate an entity to perform a full set of operations with respect to a cloud queue. Such operations may include queue playback and queue manipulation, among other examples. In contrast, read access may authenticate an entity to perform a subset of operations with respect to the cloud queue, such as queue playback or display of the queue.

Other example techniques may involve controlling access to a cloud queue based on a configuration or settings of the cloud queue itself. For instance, a host of a cloud queue may assign one of two or more different status' to a cloud queue. In one example, a cloud queue may be initially assigned a first status. While the cloud queue has the first status, the cloud queue may have full availability. At some point thereafter, the access status of the cloud queue may be modified to a second access status. While the cloud queue has the second status, the cloud queue may have limited availability. Limited availability might involve no access to the queue by entities or perhaps access that is limited to a subset of operations on the queue. For instance, under limited access, playback of the queue might be permitted, but modification of the queue might be restricted. A host may modify the access status based on detecting a trigger, such as a passage of a threshold duration of time or perhaps reaching a metric indicating a threshold amount of playback of the cloud queue, among other examples.

As indicated above, example techniques may involve controlling access to a cloud queue based on an authorization token. In one aspect, a method is provided. The method may involve obtaining an authorization token corresponding to a particular queue of media items at a remote server. The method may also involve sending (i) the obtained authorization token, and (ii) a request for access to one or more media items of the particular queue. The method may further involve receiving an indication that the media playback system may access the one or more media items.

In another aspect, a device is provided. The device includes a network interface, at least one processor, a data storage, and program logic stored in the data storage and executable by the at least one processor to perform functions. The functions may include obtaining an authorization token corresponding to a particular queue of media items at a remote server. The functions may also include sending (i) the obtained authorization token, and (ii) a request for access to one or more media items of the particular queue. The functions may further include receiving an indication that the media playback system may access the one or more media items.

In yet another aspect, a non-transitory computer readable memory is provided. The non-transitory computer readable memory has stored thereon instructions executable by a computing device to cause the computing device to perform functions. The functions may include obtaining an authorization token corresponding to a particular queue of media items at a remote server. The functions may also include sending (i) the obtained authorization token, and (ii) a request for access to one or more media items of the particular queue. The functions may further include receiving an indication that the media playback system may access the one or more media items.

In yet another aspect, another method is provided. The method may involve receiving (i) an authorization token associated with a particular media playback system, and (ii) a request for access by the media playback system to a queue of media items. The method may also involve determining the access to the queue that the authorization token authenticates to the media playback system. The method may further involve providing, the media playback system the access to the media items that the authorization token authenticates to the media playback system.

In another aspect, a device is provided. The device includes a network interface, at least one processor, a data storage, and program logic stored in the data storage and executable by the at least one processor to perform functions. The functions may include receiving (i) an authorization token associated with a particular media playback system, and (ii) a request for access by the media playback system to a queue of media items. The functions may also include determining the access to the queue that the authorization token authenticates to the media playback system. The functions may further include providing, the media playback system the access to the media items that the authorization token authenticates to the media playback system.

In yet another aspect, a non-transitory computer readable memory is provided. The non-transitory computer readable memory has stored thereon instructions executable by a computing device to cause the computing device to perform functions. The functions may include receiving (i) an authorization token associated with a particular media playback system, and (ii) a request for access by the media playback system to a queue of media items. The functions may also include determining the access to the queue that the authorization token authenticates to the media playback system. The functions may further include providing, the media playback system the access to the media items that the authorization token authenticates to the media playback system.

Also as indicated above, example techniques may involve granting entities respective types of access. In one aspect, a method is provided. The method may involve receiving (i) a request from a first media playback system for access to a queue of media items, and (ii) a request from a second media playback system for access to the queue of media items. The method may also involve granting (i) a first type of access to the first media playback system, and (ii) a second type of access to the second media playback system. The first type of access may authorize the first media playback system to perform a first set of operations on the queue of media items and a second type of access may authorize the second media playback system to perform a second set of operations on the queue of media items that is different from the first set of operations. The method may further involve providing (i) an indication that the first media playback system may access the queue as authorized by the first type of access, and (ii) an indication that the second media playback system may access the queue as authorized by the second type of access.

In another aspect, a device is provided. The device includes a network interface, at least one processor, a data storage, and program logic stored in the data storage and executable by the at least one processor to perform functions. The functions may include receiving (i) respective requests from a plurality of first media playback systems for respective access to a queue of media items, and (ii) a request from a second media playback system for access to the queue of media items. The functions may also include granting (i) a first type of access to the first media playback systems and (ii) a second type of access to the second media playback system. The first type of access may authorize the first media playback system to perform a first set of operations on the queue of media items and a second type of access may authorize the second media playback system to perform a second set of operations on the queue of media items that is different from the first set of operations. The functions may further include providing (i) the first media playback systems access to the queue as authorized by the first type of access rights, and (ii) the second media playback system access to the queue as authorized by the second type of access rights.

In yet another aspect, a non-transitory computer readable memory is provided. The non-transitory computer readable memory has stored thereon instructions executable by a computing device to cause the computing device to perform functions. The functions may include receiving (i) respective requests from a plurality of first media playback systems for respective access to a queue of media items, and (ii) a request from a second media playback system for access to the queue of media items. The functions may also include granting (i) a first type of access to the first media playback systems and (ii) a second type of access to the second media playback system. The first type of access may authorize the first media playback system to perform a first set of operations on the queue of media items and a second type of access may authorize the second media playback system to perform a second set of operations on the queue of media items that is different from the first set of operations. The functions may further include providing (i) the first media playback systems access to the queue as authorized by the first type of access rights, and (ii) the second media playback system access to the queue as authorized by the second type of access rights.

In yet another aspect, another method is provided. The method may involve sending a request for access to a queue of media items. The method may also involve receiving an indication that the media playback system may access the queue as authorized by a first type of access. The first type of access may authorize the first media playback system to perform a first set of operations on the queue of media items and a second type of access may authorize the second media playback system to perform a second set of operations on the queue of media items that is different from the first set of operations. The method may further involve receiving an indication of one or more media items of the queue.

In another aspect, a device is provided. The device includes a network interface, at least one processor, a data storage, and program logic stored in the data storage and executable by the at least one processor to perform functions. The functions may include sending a request for access to a queue of media items. The functions may also include receiving an indication that the media playback system may access the queue as authorized by a first type of access. The first type of access may authorize the first media playback system to perform a first set of operations on the queue of media items and a second type of access may authorize the second media playback system to perform a second set of operations on the queue of media items that is different from the first set of operations. The functions may further include receiving an indication of one or more media items of the queue.

In yet another aspect, a non-transitory computer readable memory is provided. The non-transitory computer readable memory has stored thereon instructions executable by a computing device to cause the computing device to perform functions. The functions may include sending a request for access to a queue of media items. The functions may also include receiving an indication that the media playback system may access the queue as authorized by a first type of access. The first type of access may authorize the first media playback system to perform a first set of operations on the queue of media items and a second type of access may authorize the second media playback system to perform a second set of operations on the queue of media items that is different from the first set of operations. The functions may further include receiving an indication of one or more media items of the queue.

As further indicated above, example techniques may involve controlling access to a cloud queue based on a configuration or settings of the cloud queue itself. In one aspect, a method is provided. The method may involve receiving a request to establish a queue of media items. The method may also involve assigning a first access status to the queue. The first access status may indicate that at least one media playback system is authorized to perform a first set of queue operations. After assigning the first access status to the queue, the method may involve detecting a trigger that indicates a change in access status of the queue. Based on the detected trigger, the method may involve modifying the access status of the queue from the first access status to a second access status. The second access status may indicate that the at least one media playback system is authorized to perform a second set of queue operations that is different from the first set of queue operations. The method may also involve sending an indication of the second access status to a media playback system.

In another aspect, a device is provided. The device includes a network interface, at least one processor, a data storage, and program logic stored in the data storage and executable by the at least one processor to perform functions. The functions may include receiving a request to establish a queue of media items. The functions may also include assigning a first access status to the queue. The first access status may indicate that at least one media playback system is authorized to perform a first set of queue operations. After assigning the first access status to the queue, the functions may include detecting a trigger that indicates a change in access status of the queue. The functions may include modifying the access status of the queue from the first access status to a second access status based on the detected trigger. The second access status may indicate that the at least one media playback system is authorized to perform a second set of queue operations that is different from the first set of queue operations. The functions may also include sending an indication of the second access status to a media playback system.

In yet another aspect, a non-transitory computer readable memory is provided. The non-transitory computer readable memory has stored thereon instructions executable by a computing device to cause the computing device to perform functions. The functions may include receiving a request to establish a queue of media items. The functions may also include assigning a first access status to the queue. The first access status may indicate that at least one media playback system is authorized to perform a first set of queue operations. After assigning the first access status to the queue, the functions may include detecting a trigger that indicates a change in access status of the queue. The functions may include modifying the access status of the queue from the first access status to a second access status based on the detected trigger. The second access status may indicate that the at least one media playback system is authorized to perform a second set of queue operations that is different from the first set of queue operations. The functions may also include sending an indication of the second access status to a media playback system.

In yet another aspect, another method is provided. The method may involve receiving (i) an indication of a queue of media items, and (ii) an indication that the queue has a first access status. The first access status may indicate that the playback device is authorized to perform a first set of queue operations. The method may also involve establishing a local instance of the queue. The method may further involve receiving an indication that the queue has been assigned a second access status. The second access status may indicate that the playback device is authorized to perform a second set of queue operations that is different from the first set of queue operations. The method may involve restricting the local instance of the queue to the second set of queue operations.

In another aspect, a device is provided. The device includes a network interface, at least one processor, a data storage, and program logic stored in the data storage and executable by the at least one processor to perform functions. The functions may include receiving (i) an indication of a queue of media items, and (ii) an indication that the queue has a first access status. The first access status may indicate that the playback device is authorized to perform a first set of queue operations. The functions may also include establishing a local instance of the queue. The functions may further include receiving an indication that the queue has been assigned a second access status. The second access status may indicate that the playback device is authorized to perform a second set of queue operations that is different from the first set of queue operations. The functions may include restricting the local instance of the queue to the second set of queue operations.

In yet another aspect, a non-transitory computer readable memory is provided. The non-transitory computer readable memory has stored thereon instructions executable by a computing device to cause the computing device to perform functions. The functions may include receiving (i) an indication of a queue of media items, and (ii) an indication that the queue has a first access status. The first access status may indicate that the playback device is authorized to perform a first set of queue operations. The functions may also include establishing a local instance of the queue. The functions may further include receiving an indication that the queue has been assigned a second access status. The second access status may indicate that the playback device is authorized to perform a second set of queue operations that is different from the first set of queue operations. The functions may include restricting the local instance of the queue to the second set of queue operations.

In another aspect, a method is provided. The method may involve displaying an indication of a queue on a graphical interface. The method may further involve receiving an indication of an access status of the queue. The method may also involve displaying an indication of the access status of the queue.

In another aspect, a device is provided. The device includes a network interface, at least one processor, a data storage, and program logic stored in the data storage and executable by the at least one processor to perform functions. The functions may include displaying an indication of a queue on a graphical interface. The functions may further include receiving an indication of an access status of the queue. The functions may also include displaying an indication of the access status of the queue.

In yet another aspect, a non-transitory computer readable memory is provided. The non-transitory computer readable memory has stored thereon instructions executable by a computing device to cause the computing device to perform functions. The functions may include displaying an indication of a queue on a graphical interface. The functions may further include receiving an indication of an access status of the queue. The functions may also include displaying an indication of the access status of the queue.

It will be understood by one of ordinary skill in the art that this disclosure includes numerous other embodiments. It will be understood by one of ordinary skill in the art that this disclosure includes numerous other embodiments. While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 illustrates an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
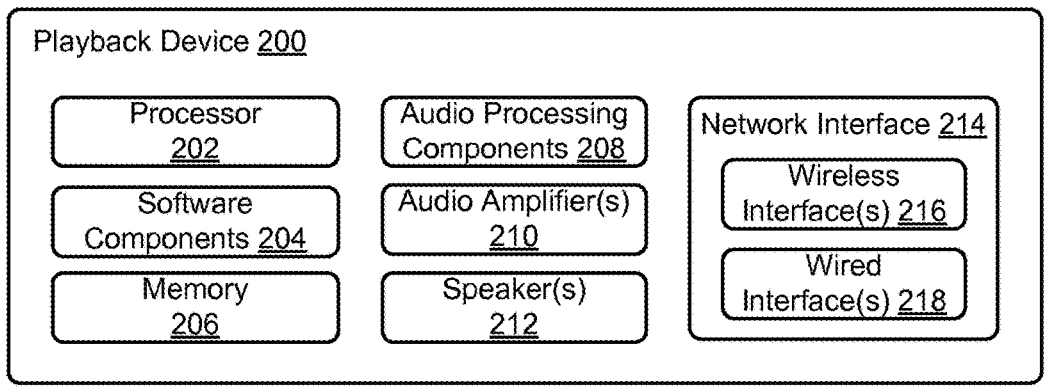
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
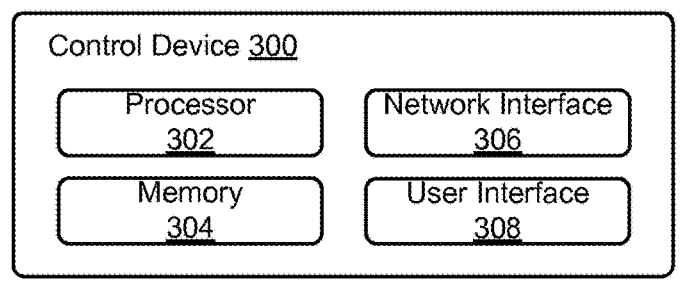
FIG. 3 shows a functional block diagram of an example control device.

FIG. 3 shows a functional block diagram of an example control device 300 that may be configured to be one or both of the control devices 126 and 128 of the media playback system 100. Control device 300 may also be referred to as a controller 300. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
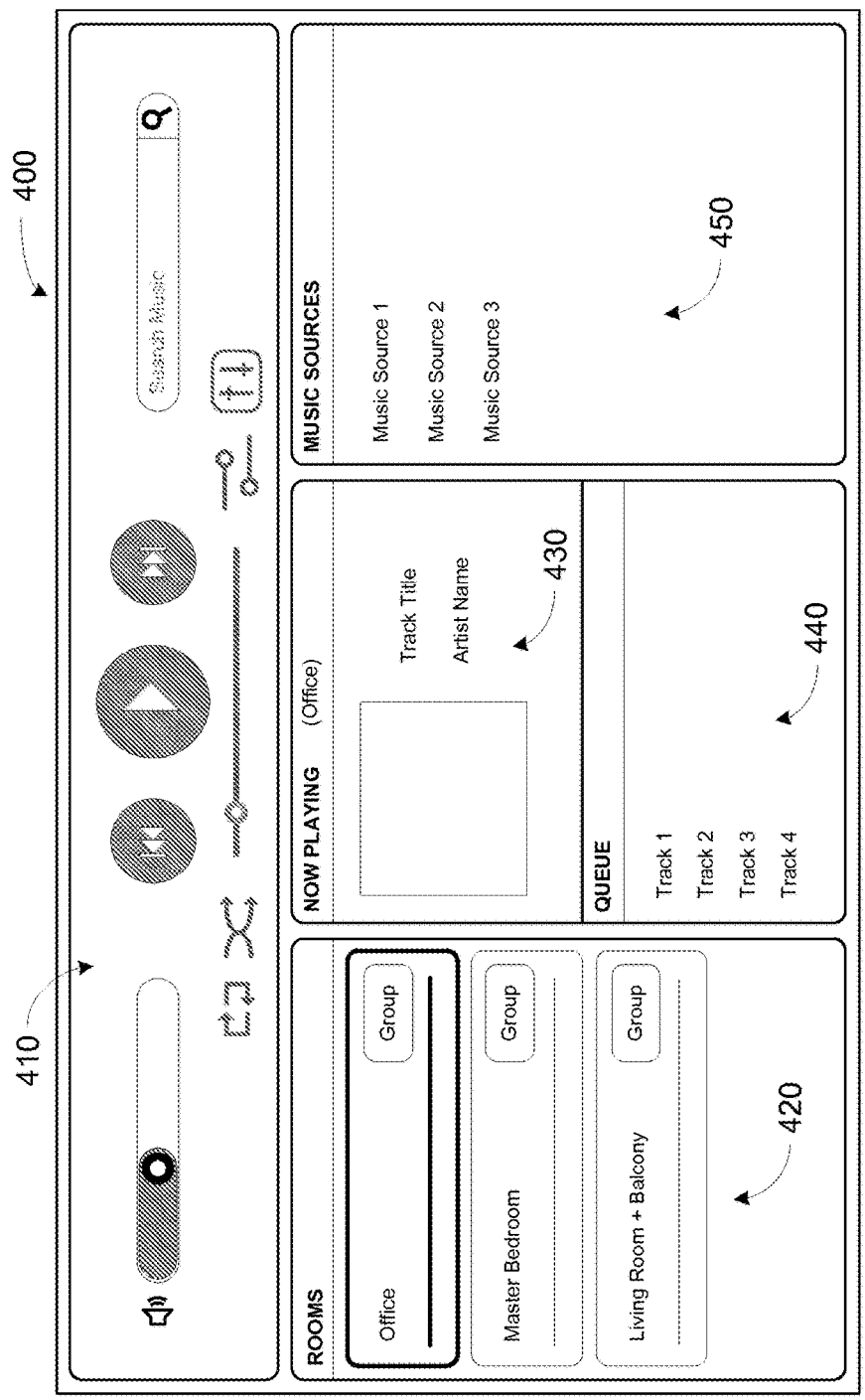
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Cloud Computing Functions

Various references are made herein to "cloud computing." The term "cloud computing" is used to refer to services delivered using distributed computing over a network, such as the Internet. A non-exhaustive list of services delivered via the cloud include electronic mail (e.g., GMAIL® or HOTMAIL®), social networking (e.g., FACEBOOK®, LINKEDIN®, or TWITTER®), file hosting (e.g., DROPBOX®), and streaming audio (e.g., SPOTIFY®, PANDORA®, or BEATSAUDIO®). Other cloud services are certainly offered as well.

Cloud service providers may offer one or more interfaces for accessing their service over a network. For instance, some cloud services may be accessed by visiting a web site using a web browser. Other cloud services are accessed by executing a particular application specific to the cloud service on a computing device. Some cloud services may offer an application programming interface (API) to facilitate access to the service by a third-party web site or application. Cloud services may provide multiple techniques for accessing their service. In many cases, a user who has access to a given cloud service can access the service from any computing device that is connected to the network, provided that the computing device has a supported interface to the cloud service.

In one instance, accessing a cloud service may involve accessing, with a first computing device (i.e., a client), a second computing device or system (i.e., a server). Example client devices may include playback device 200 of FIG. 2, or control device 300 of FIG. 3, among other possible devices. One or more programs or applications (i.e., instructions) may execute on the server to perform computing operations supported by the cloud service. The client may send various commands to the server to instruct the server to perform the computing tasks supported by the cloud service.

Figure 5:
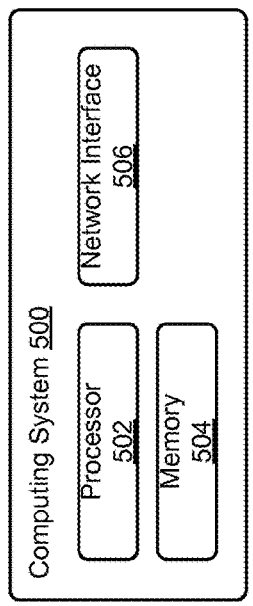
FIG. 5 shows an computing system that may practice certain embodiments.

FIG. 5 illustrates an example computing system 500 that may provide a cloud service to one or more users. Example computing system 500 includes at least one processor 502, memory 504, and a network interface 506. The memory 504 may contain instructions executable by the processor 502 to perform computing tasks supported by a cloud service. The computing device 500 may communicate with other computing devices via the network interface 506.

In aggregate, the provision of a cloud service many involve multiple instances of computing system 500. Each instance of computing system 500 may provide the cloud service to one or more users. Cloud service providers may scale the number of instances of computing system 500 involved in providing the cloud service based on user demand.

Within examples, data-based representations of "user accounts" may facilitate access to a cloud service. An individual user or a group of users may create a data-based "user account," which may also be referred to simply as an "account." An account for a particular user or user group may include data related to the particular user or user group, which the user or user group has opted to provide for association with the account. As such, the account of a particular user may, in a sense, be a data-based representation of that particular user.

A user may create an account for various applications, web sites, and/or online services, for instance. Examples of accounts include e-mail accounts, social network accounts, online financial accounts, service provider accounts, among other possibilities. Further, in some cases, a user may have a single account that provides a data-based representation of the user for multiple services, websites, applications, etc. For instance, a user might opt to use their e-mail account or social network account as a common login for various online services and applications, which might be provided by different entities. Such a data-based representation might be available to any of the instances of the computing systems involved in providing a service so that any of the instances may provide similar access to the service when a particular account is authenticated ("logged-in") with the service.

An account may also be used with devices and systems. For instance, a user of a device, such as a mobile phone, tablet computer, or laptop computer, may associate an account with the computing device itself, such that while the account is authenticated on the computing device, the account will be authenticated with applications that are provided on the computing device. The user might also associate an account with a media playback system, such that while the account is authenticated on the media playback system, the media playback system operates according to preferences of the account. Moreover, in some cases, a user's accounts for various services may be associated with one another. For instance, a user's account for a media playback system may be associated with the user's accounts for one or more streaming music services such that when a user's account for a media playback system is logged-in to the media playback system, the media playback system has access to the one or more streaming music services that are associated with the user's account for the media playback system.

Figure 6:
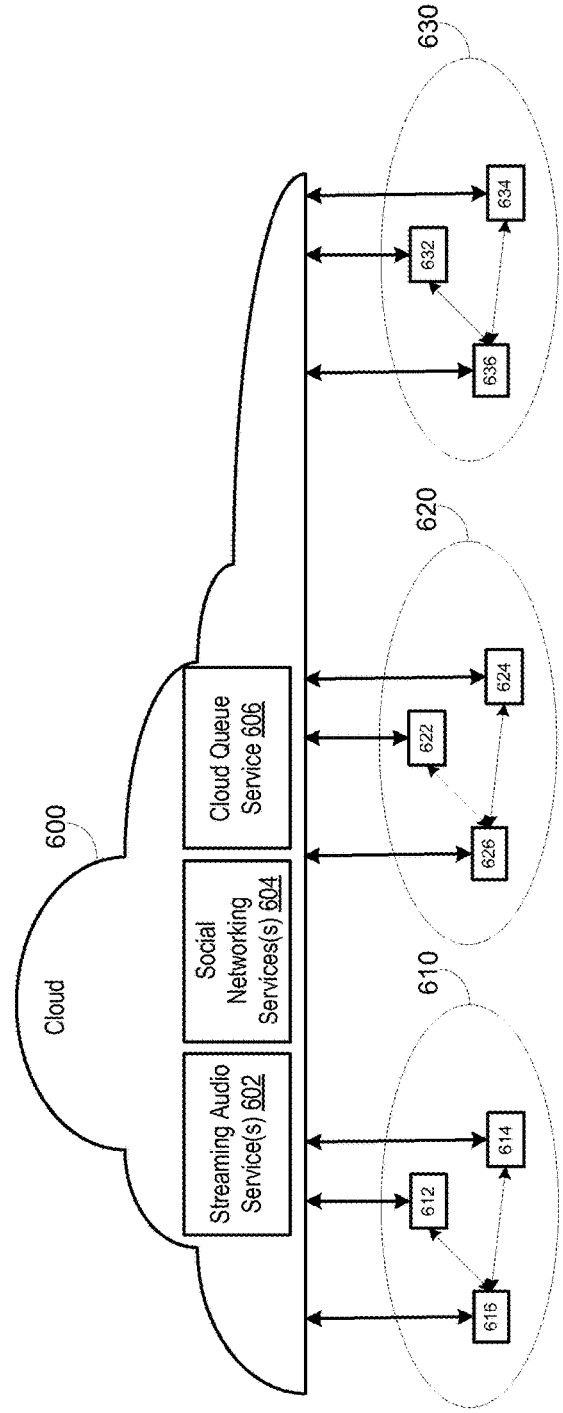
FIG. 6 shows an example cloud computing system in which certain embodiments may be practiced.

FIG. 6 illustrates an example cloud 600. The example cloud 600 may include any number of computing devices which are interconnected via one or more networks. For instance, cloud 600 may include one or more instances of computing system 500. As shown in FIG. 6, media playback systems 610, 620, and 630 are connected to cloud 600. Media playback system 610 includes playback devices 612 and 614 and control device 616, each having a respective connection to cloud 600. Likewise, media playback system 620 includes playback devices 622 and 624 and control device 626, also each having a respective connection to cloud 600. And media playback system 630 includes playback devices 632 and 634 and control device 636, also each having a respective connection to cloud 600.

Using the cloud 600, media playback systems 610, 620, and 630 may respectively access various cloud services. For instance, media playback systems 610, 620, and 630 may access one or more streaming audio services 602. As noted above, streaming audio services may provide audio content to media playback systems. Several example streaming audio services that are currently available include SPOTIFY®, PANDORA®, BEATSAUDIO®, RDIO®, GOOGLE PLAY MUSIC ALL ACCESS®, SONY MUSIC UNLIMITED®, ITUNES RADIO®, XBOX MUSIC®, and TUNEIN RADIO®. Other streaming audio services certainly exist, and other streaming audio services may be offered in the future.

Media playback systems 610, 620, and 630 may also respectively access one or more social network services 604. Social network services are often characterized at least in part by various links between users of the service (or perhaps between accounts of the service). Such links are referred to by different names, such as "friends", "connections", "followers", or "favorites," among other examples. Users may create such links for various reasons. For instance, in some cases, the users may have a relationship outside of the social network (e.g., co-workers, relatives, or college friends). In other cases, two users may have similar interests (e.g., fans of a particular band or genre) or belong to a certain group and then form a link in the social network because they share these similar interests.

A cloud service provider may provide a cloud queue service 606. The cloud queue service 606 may maintain or have access to one or more playback queues (cloud queues). In some instances, the cloud queue service 606 may maintain playback queues for media playback systems registered with the cloud queue service 606. Such playback queues may be referred to as cloud queues. In other instances, the cloud queue service 606 may maintain multiple cloud queues for a particular media playback system, perhaps with one particular cloud queue "active" (i.e., "selected") at any instant. In further instances, the cloud queue service 606 may maintain a cloud queue that multiple media playback systems may access. One or more computing systems may be used to provide the cloud queue service 606 and to maintain the cloud queue(s) in data storage.

Various devices may access the cloud queue. Accessing the cloud queue may involve any of a variety of operations with respect to the cloud queue. For instance, some devices may access the cloud queue to modify (e.g., add, remove, or re-order) media items in a playback queue maintained by cloud queue service 606. Such devices may include control devices, such as control device 300, or any suitable device having a network interface to communicate with the cloud queue service 606. As another example, a media playback system, such as media playback systems 610 and 620, may access the cloud queue to play back the cloud queue.

Devices of a media playback system may provide control inputs that cause accessing of the queue. For instance, a control device of a media playback system (e.g., control device 300) may provide an interface (e.g., controller interface 400) that includes various controls. The control device may detect input at such controls and responsively perform operations with respect to the cloud queue. Alternatively, a playback device of a media playback system may include various controls (e.g., buttons) that are operable to generate input data that requests various operations with respect to a cloud queue.

As noted above, access to a cloud queue may be controlled using various techniques. Some example techniques may involve controlling access to a cloud queue based on the identity of the entity that is accessing the cloud queue. Other example techniques may involve controlling access to a cloud queue based on a configuration or settings of the cloud queue itself.

FIG. 7 shows example playback queue 700. Playback queue 700 includes a list of entries 702-732. Entries 702-732 contain Songs A-P in positions 1-16, respectively, by having respective metadata for each song associated with each entry. The metadata may also include an indication, such as a uniform resource identifier (URI), which indicates where each song is stored. For instance, for a particular song, the metadata may include a uniform resource locator (URL) indicating where that particular song can be retrieved from a streaming audio service, such as streaming audio service 602 depicted in FIG. 6. Songs A-P may represent any of the example audio items noted above. Although playback queue 700 is shown by way of example as including 15 entries, playback queue 700 may gain additional entries or have fewer entries if media items are added (i.e., inserted) or removed (i.e., deleted) from playback queue 700, respectively. Media playback systems may play back the queue 700, perhaps in a certain order, such as sequential playback by position or random (shuffle) playback.

Playback queue 700 may be maintained for one or more media playback systems by a cloud queue service, such as cloud queue service 606, and be referred to as a "cloud queue." For example, an instance of computing system 500 of FIG. 5 (which may provide cloud queue service 606) may maintain playback queue 700 for media playback system 610. In such an example, playback device 612 and/or playback device 616 may maintain a local copy of playback queue 700, perhaps in a memory, such as memory 206 of FIG. 2. Alternately, playback queue 700 may be maintained on another computing system, such as an instance of control device 300 of FIG. 3. Such a local copy may provide a cached instance of a cloud queue, such that devices of the media playback system may access the local copy and avoid transmission delays that may be involved in accessing the cloud queue, among other possible benefits.

The above discussions relating to playback devices, controller devices, playback zone configurations, media content sources, and cloud computing provide only some examples of operating environments within which functions and methods described below may be implemented. Other operating environments and configurations of media playback systems, playback devices, and network devices not explicitly described herein may also be applicable and suitable for implementation of the functions and methods.

Methods 800, 900, 1000, 1200, 1300, 1500, and 1600 shown in FIGS. 8, 9, 10, 12, 13, 15, and 16, respectively, present embodiments of methods that can be implemented within an operating environment including, for example, the media playback system 100 of FIG. 1, one or more of the playback device 200 of FIG. 2, one or more of the control device 300 of FIG. 3, or one or more of the computing system 500 of FIG. 5. Further, operations illustrated by way of example as being performed by a media playback system can be performed by any suitable device, such as a playback device or a control device of a media playback system. Methods 800, 900, 1000, 1200, 1300, 1500, and 1600 may include one or more operations, functions, or actions as illustrated by one or more of blocks shown in FIGS. 8, 9, 10, 12, 13, 15, and 16, respectively. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods and other processes disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the methods and other processes disclosed herein, each block may represent circuitry that is wired to perform the specific logical functions in the process.

Figure 8:
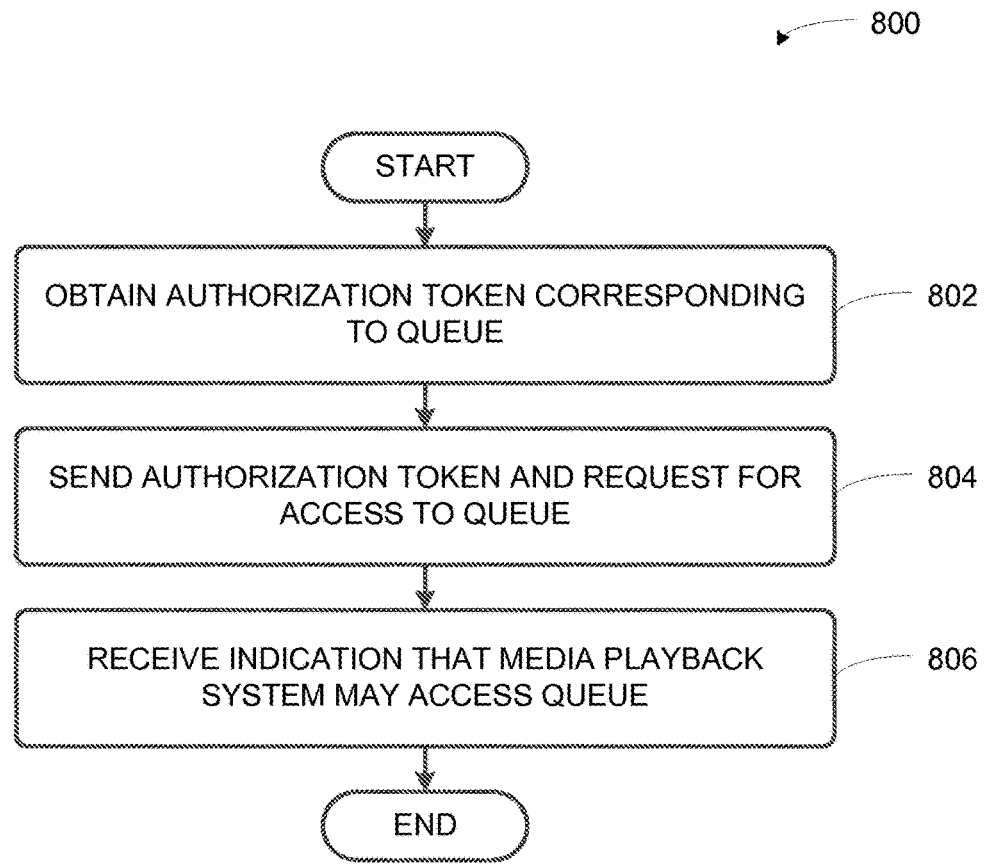
FIG. 8 is an example flow diagram to facilitate accessing a cloud queue based on an authorization token.

III. Example Techniques to Access a Cloud Queue Based on an Authorization Token As discussed above, embodiments described herein may involve accessing a cloud queue based on an authorization token. The authorization token may be used to control access to the cloud queue based on which entity (e.g., a particular media playback system or device) is attempting to access the cloud queue. For instance, a device of a media playback system may access a cloud queue. Accessing a cloud queue may involve displaying the cloud queue, playback of the cloud queue, or manipulation of the cloud queue, among other examples. FIG. 8 illustrates an example method to access a queue by way of an authorization token.

a. Obtain An Authorization Token

At block 802 of method 800, the method involves obtaining an authorization token corresponding to a queue. For instance, a media playback system, such as media playback system 100 of FIG. 1 or one of media playback systems 610, 620, and 630 of FIG. 6, may obtain an authorization token corresponding to a particular queue of media items. In some cases, a particular device of a media playback system, such as a playback device (e.g., playback device 200 of FIG. 2) or a control device (e.g., control device 300 of FIG. 3) may obtain the authorization token. The authorization may be obtained via a network interface over one or more networks, such as a wide area network (e.g., the Internet).

The particular queue may be stored at a remote server (e.g., a server involved in a providing a cloud queue service) and be referred to as a "cloud queue." A "remote" server is considered to be separated from entities that might access the queue by one or more networks, including a wide area network. For instance, referring to FIG. 6, media playback system 610 may obtain an authorization token from a server of cloud queue service 606 by way of one or more networks that communicatively couple the media playback system and the remote server. In some cases, a media playback system may obtain an authorization token corresponding to a particular queue from a remote server at which the particular queue is stored or maintained. Alternatively, a media playback may obtain an authorization token corresponding to a particular queue from another remote server, perhaps a remote server that is communicatively coupled to the remote server at which the particular queue is stored or maintained.

As noted above, the obtained authorization token may correspond to a particular queue of media items. As such, the authorization token may be used to manage access to the particular queue. For instance, a given cloud queue service may maintain or have access to one or more cloud queues, each containing zero or more media items. In such a case, an obtained authorization token may correspond to a particular cloud queue of the one or more cloud queues. An authorization token may be used by a remote server to manage access to the particular cloud queue. Alternatively, an obtained authorization token may correspond to a particular group of queues. Such a group could include cloud queues that are maintained by the cloud queue service on behalf of a particular media playback system or cloud queues that are maintained by the cloud queue service on behalf of a particular user account, among other examples.

In some implementations, the authorization token may authorize or permit an entity to perform certain operations with respect to a particular queue, such as accessing the particular queue. The entity may bear or provide the authorization token when attempting to perform one of the permitted operations, and given the authorization token's validity, be allowed to perform the operation.

An authorization token may be considered to be associated with certain "access rights" that permit different operations. In some implementations, entities attempting to perform certain operations with respect to the queue may be prohibited from performing that operation unless the entity has been authorized by way of the authentication token. For instance, an entity that bears or provides the authorization token may be permitted to perform operations that are within a certain level or set of access rights. Different access rights may be granted to different entities by way of the authorization token. For instance, a first entity (e.g., a media playback system or device) may obtain a first authorization token associated with first access rights, and a second entity may obtain a second authorization token associated with second access rights that are different from the first access rights.

As one example, the access rights associated with a given authorization token may include display rights that permit displaying the queue, and as such, an entity that has obtained the given authorization token may be permitted to perform operations involved in display of the queue. Display of the queue may involve display of indications of media items associated with the queue, perhaps by a user interface 308 of a control device 300 of FIG. 3 in a playback queue region 440 of a controller interface 400 as shown in FIG. 4. By way of example, operations involved in display of the queue may involve sending to a remote server a request for an indication of at least one media item of the queue and perhaps receiving the requested indication and displaying the at least one indicated media item.

As another example, the access rights associated with a given authorization token may include queue rights that permit manipulation of the particular queue to which the authorization token corresponds. For instance, an entity that has obtained an authorization token that is associated with queue rights may be permitted to add media items to the queue, remove media items from the queue, or re-order media items within the queue, among other examples. In some embodiments, an entity (e.g., a media playback system or a device of such a system) may send a request to manipulate the queue to a remote entity (e.g., a server) that is maintaining the queue.

As a further example, the access rights associated with a given authorization token may include playback rights that permit playback of the media items of the particular queue. For example, an entity that has obtain an authorization token that is associated with queue rights may be permitted to request an indication of media items from the queue, and then play back those media items. As noted above, a device may maintain a local copy of a cloud queue. Playback of a cloud queue may involve requesting an indication of at least one media item from the cloud queue, including the indicated media items in the local copy, and playing back the media items of the local copy of the cloud queue.

In one example, a given authorization token may authenticate one or more particular devices of a media playback system, such as one or more instances of playback device 200 of FIG. 2. Obtaining such an authorization token may involve sending, to a remote server, a request for an authorization token that authenticates one or more particular devices of a media playback system to play back media items of the queue. After sending the request, the media playback system may receive the requested authorization token. In some cases, two or more devices may be joined into a group that can perform some joint operations, such as synchronous playback. In such cases, the obtained authorization token might authenticate the two or more devices to playback media items of the queue in synchrony.

As noted above, in some embodiments, a media playback system might be associated with one or more user accounts. Such an association may be formed when a user account logs into the media playback system, perhaps by way of an instance of control device 300 of FIG. 3. In some cases, the authorization token might authenticate one or more particular user accounts to access a cloud queue at a remote server. By authenticating a user account with an authorization token, any media playback system to which the user account is logged-in may be authenticated to access the queue. In such an instance, obtaining the authorization token might involve a media playback system sending, to the remote server, a request for an authorization token that authenticates a particular account to access the queue at the remote server. If the particular user account is authorized, the remote server might grant the request and send the requested authorization token. The media playback system may then receive the requested authorization token. In some cases, the received authorization token authenticates a control device registered with the particular account to access the queue at the remote server. The control device may be a device that provides a controller interface which facilitates access to the cloud queue, and accordingly, access to the cloud queue may be performed by way of the control device 300.

In some cases, a control device of a media playback system may obtain an authorization token that corresponds to a particular queue, perhaps in response to receiving input data indicating a request to access the particular queue. The controller may cause a graphical interface to display a controller interface that includes controls or other interface elements corresponding to the access associated with the obtained authorization token. For instance, if the authorization token permits displaying a cloud queue, the controller might display a controller interface having a playback queue region that shows the cloud queue, such as an instance of playback queue region 440 shown in FIG. 4. Further, if the authorization token does not permit playback of the cloud queue, the controller interface might not include a playback control region (e.g., playback control region 410 of FIG. 4) or might indicate that the playback control region is disabled or unavailable for the cloud queue.

After obtaining the authorization token, the control device may send the authorization token to one or more additional devices of the media playback system, and the additional devices may access the queue using the authorization token. In one example, a control device of a media playback system may send a request for an authorization token that authenticates access to the queue at the remote server. Thereafter, the control device may receive the requested authorization token. The control device may then send the received authorization token to one or more playback devices of the media playback system. As noted above, any of the entities having the authorization token may use the authorization token to access the queue, as entities providing the authorization token to the remote server may be authenticated to access the queue.

Alternatively, a playback device of a media playback system may obtain an authorization token that corresponds to a particular queue, perhaps in response to receiving a request to play back or otherwise access the particular queue. After obtaining the authorization token, the playback device may distribute the authorization token to one or more additional devices of the media playback system, such that the additional devices may access the queue using the authorization token. In one example, a given playback device of a media playback system may send a request for an authorization token that authenticates access to the queue at the remote server. Thereafter, the given playback device may receive the requested authorization token. The control device may then send the received authorization token to one or more additional playback devices of the media playback system. In one implementation, the one or more additional playback devices may be playback devices with which the given playback device is grouped. All of the playback devices having the authorization token may access the queue, as entities providing the authorization token to the remote server may be authenticated to access the queue.

Within examples, the obtained authorization token may take various forms. For instance, the obtained authorization token may include a hypertext transfer protocol header that indicates an authorization code that authenticates certain operations with respect to a cloud queue. In such cases, obtaining the authorization token may involve receiving data indicating a hypertext transfer protocol header that indicates an authorization code. The authorization code indicated in the header may authenticate access rights to queue of media items at the remote server (e.g., a cloud queue). Alternatively, a file (i.e., non-transitory data) may indicate the authorization token.

Within examples, an authorization token may grant access to a queue for a limited duration. For instance, an authorization token may grant access rights to a queue for the duration of a session. In such an embodiment, obtaining the authorization token may involve sending (i) an indication of a given session of the media playback system to the remote server and (ii) a request for an authentication token that authenticates the media playback system to access the queue at the remote server for the duration of the given session. Further, obtaining the authorization token may involve the media playback system receiving the requested authorization token that authenticates the media playback system to access the queue at the remote server for the duration of the given session.

In some cases, obtaining an authorization token may involve an entity sending one or more credentials (e.g., a user name and password) to the remote server. The remote server may determine whether the credentials authorize the entity to obtain an authorization token, and if so, send the requested authorization token to the entity. In some cases, the credential may include one or more credentials of a user account, such as any of the user accounts noted above.

After obtaining the authorization token, a device (e.g., a playback device or a control device) may store the authorization token in a data storage, such as memory 206 of playback device 200 or memory 304 of control device 300. The device may then provide an indication of the stored authorization token to a remote server when accessing the cloud queue corresponding to the authorization token.

b. Send Authorization Token and Request for Access to Queue

At block 804, the method involves sending the obtained authorization token and a request for access to the cloud queue. For instance, the media playback system may send to the remote server, the obtained authorization token, and a request for access to one or more media items of the particular cloud queue. The media playback system may send the token and request via a network interface over one or more networks, including a wide area network.

As noted above, an entity (e.g., a media playback system or a device thereof) may bear or provide the authorization token when attempting to perform one of the permitted operations, and given the authorization token's validity, be allowed to perform the operation. Providing the authorization token may involve sending the authorization token (or an indication of the authorization token) to a remote server, which might be a remote server that is maintaining the cloud queue or perhaps a different remote server that is communicatively coupled to the remote server that is maintaining the cloud queue.

As noted above, in some cases, the obtained authorization token may permit displaying the queue. In some examples, sending the request for access may involve sending a request for an indication of one or more media items for display. In some implementations, the one or more media items may include all of the media items in a cloud queue. In other implementations, the one or more media items may include a subset of the media items of the cloud queue. The subset might include a currently playing media item, and perhaps one or more media items that are proximate to the currently playing media item within the queue.

Also as noted above, the obtained authorization token may permit playback of the queue. In such examples, sending the request for access may involve sending a request for an indication of one or more media items for playback.

In further examples, the obtained authorization token may permit manipulation of the queue (e.g., adding items to the queue, removing items from the queue, or re-ordering items within the queue). With such an authorization token, sending the request for access may involve sending a request to manipulate the queue. A control device of a media playback system might send such a request based on receiving input data that indicates such manipulation.

c. Receive Indication that the Media Playback System May Access the Queue

At block 706, the method involves receiving an indication that the media playback system may access the queue. For instance, the media playback system may receive from the remote server an indication that the media playback system may access the one or more media items of the particular queue for which access was previously requested. A device of the media playback system may receive the indication via a network interface over one or more networks.

Receiving an indication that the media playback system may access the queue may involve receiving data indicating the one or more media items of the particular queue. As noted above, in some cases, the obtained authorization token may include display rights that permit displaying the queue. In such a case, the media playback system may request an indication of one or more media items from the queue for display. Thereafter, the media playback system may receive data indicating the one or more media items of the particular queue. In some cases, the method may further involve displaying respective indication of the one or more media items. For instance, a control device of a media playback system may cause a graphical interface to display indications of the one or more media items. The indications may be displayed in a playback queue region of a controller interface, such as playback queue region 440 of controller interface 400.

In other cases, receiving an indication that the media playback system may access the queue may involve receiving data indicating (i) the one or more media items of the particular queue and (ii) respective sources of the one or more media items. As noted above, in some instances, the obtained authorization token may include queue rights that permit manipulating the queue. Manipulation of the queue may involve adding, removing, or re-ordering media items of the queue, and may also include changing the playback order of the queue (e.g., by way of a skip forward or skip backward command). In such a case, the media playback system may send a request to manipulate the queue to the remote server. Thereafter, the media playback system may receive an indication of the queue, perhaps showing the queue after the requested manipulation. For instance, the media playback system may send to a remote server a request to add one or more media items to a particular queue. The remote server may add the one or more media items, and send to the media playback system receiving data indicating (i) the one or more media items of the particular queue and (ii) respective sources of the one or more media items. In some embodiments, the media playback system may add the indicated one or more media items to a local queue of the media playback system.

In still other cases, receiving the indication that the media playback system may access the one or more media items may involve the media playback system receiving data indicating (i) the one or more media items of the particular queue and (ii) respective sources of the one or more media items. As noted above, in some instances, the obtained authorization token may include playback rights that permit playback of media items of the particular queue. In such a case, the media playback system may request an indication of at least one media item from the queue for playback, perhaps in response to receiving input data indicating a request to playback the queue. Thereafter, the media playback system may receive data indicating (i) the one or more media items of the particular queue and (ii) respective sources of the one or more media items. In some instances, the media playback system may obtain at least one of the one or more media items from the respective sources, perhaps to playback the at least one media item.

Receiving data indicating respective sources of the one or more media items may involve receiving respective identifiers that may be used to obtain the media items. For instance, as noted above, in some examples, each media item in the queue of media items is assigned a unique identifier. The unique identifier may be a uniform resource identifier (URI), a uniform resource locator (URL) or some other identifier that may be used by a device to find and/or retrieve the audio item from a local audio content source or a networked audio content source, possibly for playback by the entity.

In some cases, the method may also involve receiving an indication that the obtained authorization token has expired such that access to the queue of media items at the remote server is withdrawn from the media playback system. As noted above, in some cases, the authorization token may grant access to a particular queue for the duration of a given session. Accordingly, the authorization token may expire based on the occurrence of a condition. For instance, the authorization token may expire after a given duration of time, after a threshold number of accesses have occurred, after the queue has been played back for a threshold duration of time, or after a threshold number of media items from the queue have been played back, among other examples. In some cases, the remote server may determine that the authorization token has expired, perhaps by detecting one of the above conditions. The remote server may then send an indication that the obtained authorization token has expired, which may the media playback system may receive.

Under certain conditions, an authorization token may be renewed rather than expiring. For instance, the remote server may determine that playback of the particular queue has satisfied at least one condition for renewal, and, based on such a determination, renew the authorization token. Example conditions for renewal might be that playback of the particular queue exceeded a threshold duration or that playback of the particular queue exceeded a threshold proportion of a given session (e.g., that a threshold number of media items have been played back). In some cases, a media playback system may send, to the remote server, a request to renew the received authorization token based on playback, by the media playback system, of the media items of the queue during the given session. The media playback system may send playback data indicating playback of the particular queue during the session from which the remote queue may determine that playback of the particular queue has satisfied at least one condition for renewal. Given that the media playback system is eligible for a renewed authorization token, the media playback system may receive a renewed authorization token, which authenticates the media playback system to access the queue at the remote server for a second duration of the given session, or for some other suitable duration, such as a lesser duration.

Figure 9:
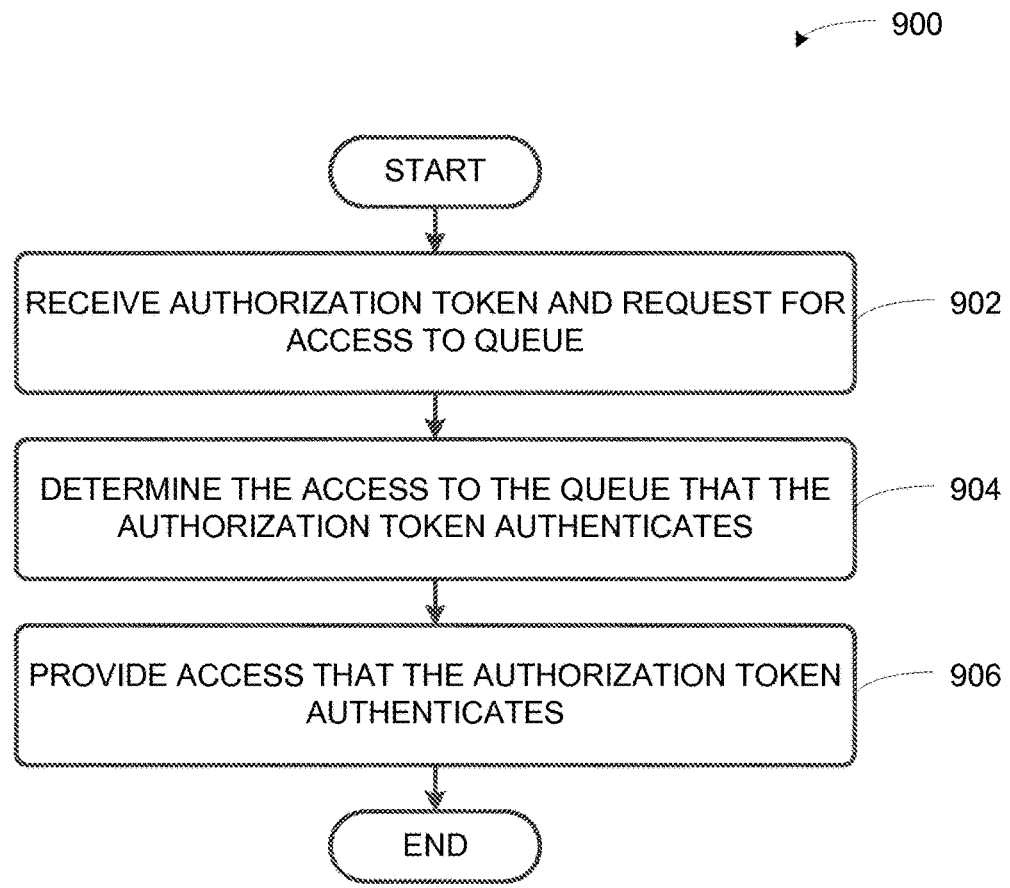
FIG. 9 is an example flow diagram to facilitate controlling access to a cloud queue based on an authorization token.

IV. Example Techniques to Control Access to a Cloud Queue Based on an Authorization Token As noted above, embodiments described herein may involve controlling and/or accessing a cloud queue based on an authorization token. FIG. 9 illustrates an example method by which a remote server may control access by various media playback systems to a cloud queue.

a. Receive Authorization Token and Request for Access to Queue

At block 902 of FIG. 9, the method involves receiving an authorization token and a request for access to a particular queue. For instance, a computing system (e.g., a remote server) might receive, via a network interface, an authorization token associated with a particular media playback system, and (ii) a request for access by the media playback system to a queue of media items that is remote from the media playback system (perhaps maintained by the computing system).

The computing server may be operated by various entities, perhaps depending on which entity is assigned to control access to the cloud queue. In one example, a remote server of cloud queue server 606 may receive the authorization token and request for access from media playback system 610 over one or more networks that communicatively couple the systems. In another example, a remote server of streaming audio service 602 may receive the authorization token and request for access from media playback system 610 over one or more networks that communicatively couple the systems. In another case, the server might be operated by a cloud hosting provider on behalf of an entity that is controlling access to a cloud queue. The received authorization token may take the form of any of the example authorization tokens provided above, as well as any other suitable authorization token.

As noted above, an entity may provide an authorization token to a computing system that is maintaining a cloud queue when attempting to perform an operation with respect to the queue. Given that the authorization token indicates that the entity is authorized to perform the operation and that the authorization token is valid, the computing system may allow the operation to be performed, and may perform the operation. In some cases, the entity may provide the authorization token and the request for access in the same message. Alternatively, the entity may provide the authorization token and the request for access in the separate messages.

As noted above, accessing a cloud queue may involve displaying the cloud queue, playback of the cloud queue, or manipulation of the cloud queue, among other examples. Accordingly, in some cases, receiving the request for access may involve receiving a request for an indication of one or more media items for display. In other cases, receiving the request for access may involve receiving a request for an indication of one or more media items for playback. In further examples, the received authorization token may permit manipulation of the queue (e.g., adding items to the queue, removing items from the queue, or re-ordering items within the queue). With such an authorization token, receiving the request for access may involve receiving a request to manipulate the queue.

The data correlating authorization tokens to entities and operations may be updated based on certain conditions. For instance, the data may be updated upon request by authorized devices (e.g., devices bearing authorization tokens that authenticate the device to update the data). Alternatively, the data may be updated as part of a registration procedure. For instance, the data may be updated when new media playback systems or devices are registered (e.g., associated with a particular user account). As another example, the data may be updated when new content sources, such as streaming audio services, are registered.

As noted above, an authorization token may grant access to a queue for a limited duration. For instance, the received authorization may grant access to a queue for a duration of a given session. Accordingly, in some cases, the request for access to the queue may include a request for access to the queue for a duration of the given session (e.g., for the remainder of the session).

b. Determine the Access to the Queue that the Authorization Token Authenticates

At block 904, the method involves determining the access to the queue that the authorization token authenticates. For instance, a computing system may maintain or have access to data indicating the access that each granted authorization token provides. The computing system may determine the access to the queue that the received authorization token provides based on such data. The data may take the form of a database.

Determining the access to the queue that the authorization token authenticates involves identifying the cloud queue to which the authorization token provides access. As noted above, each authorization token may correspond to one or more particular queues. The computing system may maintain or have access to data linking each authorization token to one or more particular queues, which the computing system may refer to in identifying the cloud queue(s) to which the authorization token provides access.

In some embodiments, determining the access to the queue that the authorization token authenticates involves determining one or more operations that the authorization token authenticates an entity to perform. Access to a cloud queue may take the form of a defined set of operations that can be performed with respect to a cloud queue. As noted above, each operation may involve a request sent from an entity (such as a media playback system) to a remote server, which the remote server may carry out given that the request is authorized. In some cases, the operations may be defined in an application programming interface (API) or other suitable definition.

The operations may be divided into different categories based on the type of access. For instance, operations involved in display, such as requesting media items from a cloud queue for display, may be categorized as display operations. As another example, operations involved in queue manipulation, such as adding media items to the queue, removing media items from the queue, or re-ordering media items within the queue, may be categorized as manipulation operations. Another category of operations might be playback operations, which may include operations involved in playback of the queue. In some cases, such categories might be used in determining the access to the queue that the authorization token authenticates. For instance, the computing system may determine which categories of operations that the authorization token authenticates.

In some embodiments, the operations may be divided into two or more access levels that are different from one another. For instance, the operations may be divided into "full" access, which includes the full set of operations, and partial access, which includes a subset of operations. As another example, each level may include certain categories of operations. For example, a first level may include the manipulation and display categories, while another level includes the playback and display categories. In such embodiments a given authorization token may authenticate an entity to perform operations within a given level.

As noted above, in some examples, an authorization token may have a duration of validity. For instance, an authorization token may be valid for the duration of a given session. In such cases, determining the access to the queue that the authorization token authenticates may involve determining whether the authorization token is still valid or whether the token has expired. Expiration of an authorization token may result in a withdrawal of access to the queue. For example, an expired authorization token might not provide any access to the queue, or may provide limited access as compared to when the token was valid. For instance, a given token may authorize playback and display operations while valid, and, after expiration, may authorize only display operations, or no operations at all.

c. Provide Access that the Authorization Token Authenticates

At block 906, the method involves providing the access that the authorization token authenticates. Providing the access that the authorization token indicates may involve carrying out the received request for access by the media playback system, given that the authorization token authorizes the request. For instance, the computing system may provide access to media items of the queue by performing operations involved in display, playback, or manipulation of the queue, according to the type of operation indicated in the request for access.

In some cases, the authorization token might be expired. In such cases, providing the media playback system the access that the authorization token authorizes may include sending the media playback system an indication that the authorization token has expired such that access to the queue of media items at the remote server is withdrawn or otherwise restricted. Based on such a message, the media playback system may restrict certain operations with respect to the queue. For instance, a control device of the media playback system may cause a graphical interface to display an indication that access to the cloud queue is withdrawn, and may perhaps disable certain controls that require the withdrawn access.

In some cases, the method may further involve providing an entity (e.g., a media playback system or device) an authorization token. The computing system might provide an authorization token prior to providing access to the queue, perhaps at the beginning of a session. In one example, the computing system may receive a request for an authorization token that authenticates an entity (e.g., the entity sending the request, which might be a device of a media playback system) to access a particular queue of media items (or perhaps a group of particular queues). The computing system may also receive one or more credentials, such as a user name and password of an account, which might be used to determine that the requesting entity is authorized to be provided the requested authorization token. Upon determining that the request is authorized, the computing system may send the requested authorization token to the entity. In other words, the computing device may send the authorization token and the access requested.

In some embodiments, the computing system may receive an indication of a given session, and a request for an authorization token that authenticates an entity for the duration of the given session. The computing system may then send such an authorization token to the entity, perhaps based on the one or more credentials provided by the entity. The computing system may then provide the entity access to the queue until the authorization token expires.

As noted above, in some examples, authorization tokens may be renewed after expiration perhaps based on one or more conditions. For instance, the computing system may receive a request to renew the received authorization token. The computing system may also receive playback history data, which the computing system may use to determine whether the authorization token is renewable. For instance, the playback history data may indicate playback history of the media items of the queue during the given session, and based on the received playback history, the computing system may determine that playback of the media items of the queue during the given session exceeds a threshold for renewal of the authorization token. Based on such a condition, the computing system may send the entity a renewed authorization token that authenticates the media playback system to access the queue at the remote server for additional time, such as a second duration of the given session.

V. Example Techniques to Provide Access Control Levels

Figure 10:
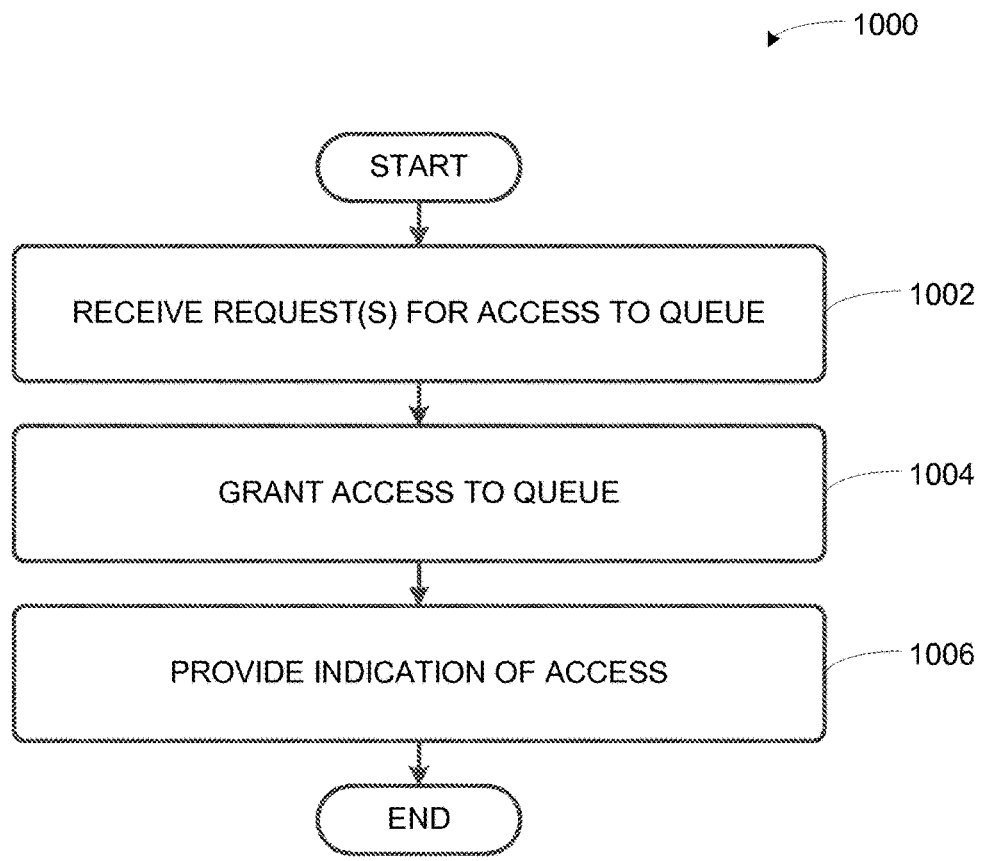
FIG. 10 is an example flow diagram to facilitate providing access control levels.

As noted above, embodiments described herein may involve providing varying levels of access to a cloud queue. FIG. 10 illustrates an example method to provide varying levels of access to two or more entities.

a. Receive Requests for Access to a Queue

At block 1002 of method 1000, the method involves receiving one or more requests for access to a queue of media items. For instance, a computing system may receive a request from a first media playback system for access to a queue of media items. The computing system may also receive a request from a second media playback system for access to the queue of media items. The computing system may receive the requests over one or more networks via a network interface. As one example, a remote server of a cloud service, such as cloud queue service 606, may receive respective requests for access to a cloud queue from media playback system 610 and media playback 612.

In some embodiments, each request for access may include a request to perform one or more operations with respect to a cloud queue. The operations may include any of the example types of operations noted above in connection with sending or receiving a request for access. For instance, the requests for access may include requests to perform operations involved in the display of the cloud queue, playback of the cloud queue, or manipulation of the cloud queue, among other examples.

In some embodiments, the request for access may include a mechanism by which the computing system may authenticate access to the queue. For instance, each request for access may include an authorization token. Alternatively, each request for access may include one or more credentials.

b. Grant Access to Queue

At block 1004, the method involves granting access to the queue. For example, the computing system may grant a first type of access to the first media playback system and may grant a second type of access to the second media playback system. As noted above, access to a cloud queue may include a defined set of operations that can be performed with respect to a cloud queue. Granting access may involve authorizing the media playback system to perform certain operations with respect to the queue. As noted above, a media playback system may perform queue operations by sending requests for such operations via a network interface to a computing system that maintains or has access to the cloud queue that the media playback system is attempting to access.

Each type of access may provide a different level of access. For instance, the second type of access may provide "full" access, which may include authorization to perform the full set of operations with respect to the cloud queue. The first type of access may then provide partial access, which may include authorization to perform a subset of the operations. Alternatively, the first type of access and the second type of access may authorize an entity to perform a first subset of operations and a second subset of operations, respectively. The first and second subset of operations may include some of the same operations, but be different from one another in that the respective sets do not include all of the same operations.

As noted above, the operations may be divided into different categories. For instance, operations involved in display, such as requesting media items from a cloud queue for display, may be categorized as display operations. As another example, operations involved in queue manipulation, such as adding media items to the queue, removing media items from the queue, or re-ordering media items within the queue, may be categorized as manipulation operations. Another category of operations might be playback operations, which may include operations involved in playback of the queue. In some cases, each type of access may include authorization to perform certain categories of operations. For example, the second type of access may be authorized to perform operations in the manipulation and display categories, while the first type of access may be authorized to perform operations in the playback and display categories.

In some cases, the types of access may be differentiated by their respective authorization (or lack thereof) to control which media item in the cloud queue is currently playing and/or whether the media item in the cloud queue is playing or paused. A media playback system might control which media item in the cloud queue is currently playing by sending requests that correspond to various transport controls. For instance, a media playback system may send to the remote server a request to play, pause, skip to the next media item in the queue, skip to the previous media item in the queue, jump to a particular media item (or position) in the queue, among other examples. In some embodiments, a media playback granted the second type of access may be authorized to perform the full set of transport functions, while a media playback system granted the first type of access may be authorized to perform a subset of transport functions. For instance, the first type of access may authorize play and pause, but perhaps not transport functions that change the currently playing media item (e.g., skip or jump).

In some cases, a "playhead" indicator may indicate the currently playing media item of the queue, perhaps by reference to a particular position in the queue. For instance, referring back to FIG. 7, song E might be the currently playing media item, and the playhead indicator may indicate song E by reference to position 5. The computing system may maintain or have access to data indicating the playhead. Playback of the queue may occur at the media item indicated by the playhead. Operations that affect the currently playing media item might change the position indicated by the playhead, which may in turn affect which media item is currently playing back.

As noted above, a media playback system may play back a cloud queue, perhaps by way of one or more playback devices. Further, two or more media playback systems may play back a cloud queue in synchrony, such that the media playback systems provide a joint listening experience. In some examples, the second type of access might include authorization to control which media item in the cloud queue is currently playing. Accordingly, a media playback system that is granted the second type of access may request to change the currently playing media item of the cloud queue, and thereby change the currently playing media item for other media playback systems that are currently playing back the cloud queue.

Accordingly, a media playback system that is authorized to change the currently playing media item of the cloud queue may be referred to as a "DJ" media playback system. Media playback systems that are granted the first type of access might not be authorized to change the currently playing media item, and, accordingly, may be referred to as "listeners." In some playback modes, the DJ media playback system may control which media items of the cloud queue are played back, by controlling which media item is currently playing. Media playback systems that are "listeners" may "follow" the playback order set by the DJ media playback system.

Figure 11:
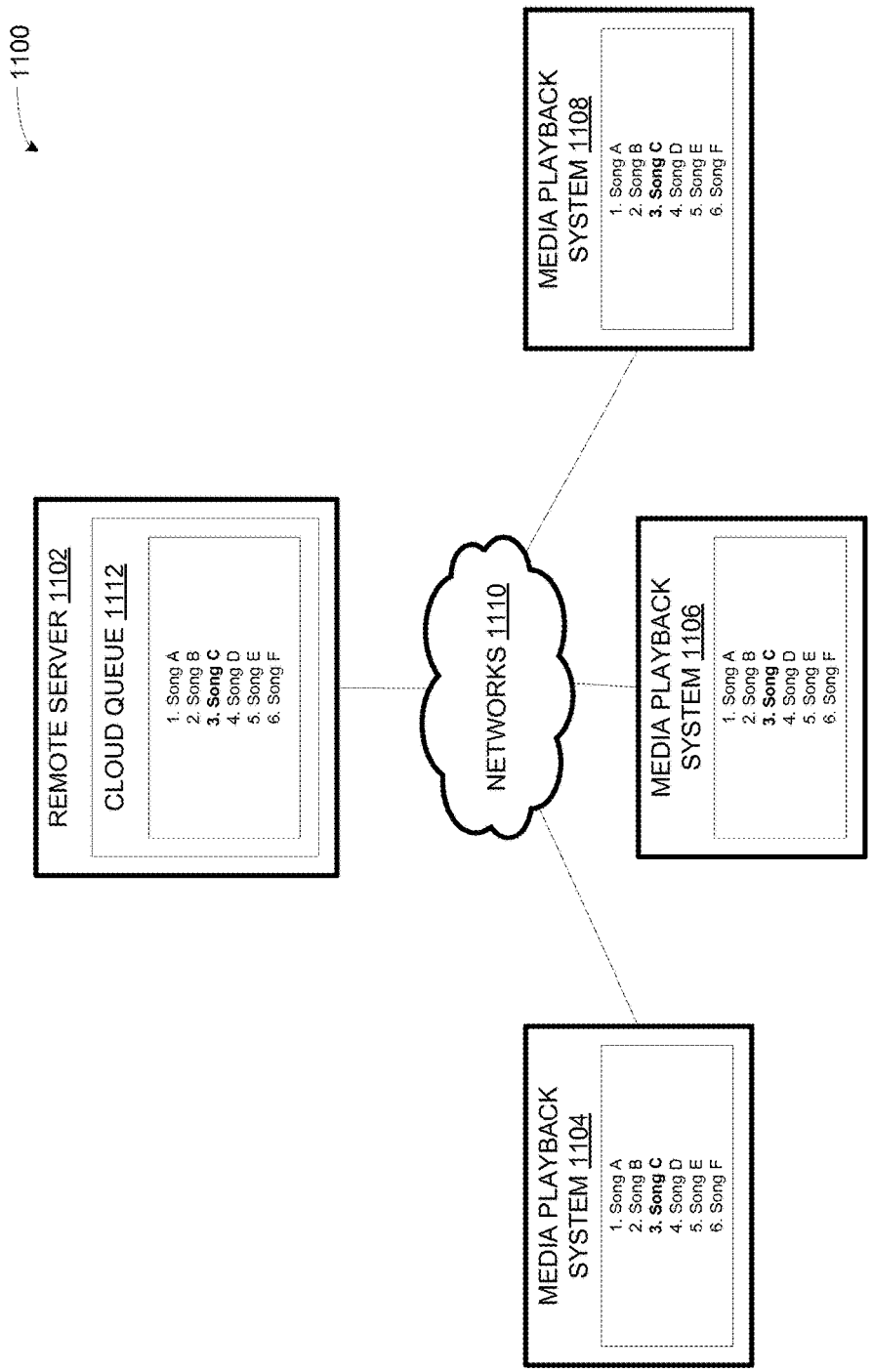
FIG. 11 is an example environment in which certain embodiments may be practiced.

FIG. 11 illustrates an example environment 1100 that includes a remote server 1102 that includes a cloud queue 1112. Remote server 1102 is connected to media playback system 1104, media playback system 1106, and media playback system 1108 by one or more networks 1110, which may include one or more wide area networks, such as the Internet, as well as one or more local area networks. In one example, remote server 1102 may grant media playback system 1104 a second type of access. In this example, the second type of access may permit media playback system 1104 to change the currently playing media item of the cloud queue 1112 (i.e., to "DJ") and perhaps also manipulate the queue by inserting, removing, or re-ordering items.

Remote server 1102 may grant a first type of access to media playback systems 1106 and 1108. The first type of access may permit playback of cloud queue 1112, perhaps as directed by media playback system 1102 (the "DJ"). For example, media playback system 1104 may set the current media item of queue 1112 to Song C in position 3, as shown, perhaps by changing or setting the position of a playhead. Media playback system 1106 and/or media playback system 1108 may access queue 1112 according to the first type of access. As noted above, this may involve playing back queue 1112 as directed by media playback system 1104. Changes made to queue 1112 or to the currently playing media item by media playback system 1104 may propagate via remote server 1102 to media playback systems 1106 and 1108. For instance, media playback system 1104 may send a request to change a playhead from a first position in queue 1112 to a second position in queue 1112 (e.g., to skip forward to the next media item in the queue). The remote server 1102 may receive the request, determine that the access granted to media playback system 1104 authorizes the system to perform the requested action and then carry out the request. Remote server 1102 may cause respective playback devices of media playback systems 1106 and 1108 to playback a media item corresponding to the second position, perhaps by sending an indication of the new currently playing media item to media playback systems 1106 and 1108.

The method may further involve determining whether the requesting entity is authorized to access the queue. For instance, the computing system may determine whether a received authorization token or credential authorizes an entity to be granted the access requested by the entity. The computing system may grant access (or might not grant access) based on such a determination.

The method may further involve determining which media playback system is granted which type of access. As noted above, in some cases, the second type of access may authorize more operations with respect to the queue (e.g., access to the full set of operations that can be performed) than the first type of access. Alternatively, the second type of access may authorize operations that involve a greater amount of control with respect to the queue than the first type of access (e.g., authorization to perform manipulation operations, as compared to playback and/or display operations). Accordingly, some embodiments may limit which media playback system(s) are granted such access.

In some embodiments, each type of access might be limited to a limited number of media playback systems. For instance, the second type of access may be limited to one media playback system. In such a case, when receiving a request to grant a media playback system a particular type of access, the computing system may determine whether granting that type of access to the media playback system would exceed a threshold number of media playback systems. If so, the computing system may deny the request to grant the particular type of access to the media playback system, and perhaps send an indication of the denial to the requesting media playback system.

In some cases, the computing system may cycle the types of access among the media playback systems that are accessing a particular cloud queue. Under such an example, each media playback system might be granted the second type of access for a limited duration of time, and be granted the second type of access at other times. For instance, referring back to the DJ example of FIG. 11, media playback systems 1104, 1106, and 1108 may alternate acting as the DJ every thirty minutes (or some other suitable duration). In operation, the computing system might detect that a first media playback system has been granted a second type of access for a threshold duration of time, and based on such a detection, grant a second media playback system the second type of access and grant the first media playback system the first type of access.

In some cases, the type of access granted to each media playback system may be based on a user account that is associated with the respective media playback system. In such an embodiment, any media playback system to which the user account is logged-in (or otherwise associated) might be granted the access that is granted to the user account. A particular user account may be associated with multiple media playback systems, such that the multiple media playback systems may have the access granted to the user account.

In some embodiments, the computing system may grant media playback systems (or user accounts) that are accessing a particular cloud queue for the first time a particular type of access. For instance, upon the first instance of granting an entity access to a particular cloud queue, the computing system may grant the entity the second type of access (e.g., full access) for a limited duration (e.g., a limited duration of absolute time, or a limited duration of playback time). For example, in operations, the computing system might receive a request from a third media playback system for access to the queue, determine that the request is a first instance of a request from the third media playback system, and based on such a determination, grant the third media playback system the second type of access (e.g., full access).

Within examples, some types of access may permit an entity to request that another entity be granted a particular type of access. For example, a media playback system having the second type of access might be authorized to grant another media playback system (perhaps having the first type of access) the second type of access. In operation, the computing system might receive a request from the second media playback system to grant a particular type of access to a particular media playback system, determine that the type of access granted to the second media playback system authorizes the second media playback system to grant the particular type of access, and based on such a determination, grant the second type of access to the particular media playback system.

In some cases, the type of access granted to an entity may be based on which entity created the cloud queue. For instance, a device associated with a particular user account may send a request to establish a cloud queue to the computing system. The computing system may carry out the request by establishing the cloud queue, and grant the user account the second type of access on the basis of having established the cloud queue. Other user accounts that access the cloud queue may be granted the second type of access. The types of access granted to each entity may change, perhaps based on certain conditions, as noted above.

c. Provide Indication of Access

At block 1006, the method involves providing an indication of access. The computing system may provide an indication that a first media playback system may access the queue as authorized by the first type of access, and may provide an indication that a second media playback system may access the queue as authorized by a second type of access.

In some cases, the computing system may indicate that a media playback system may access the queue as authorized by a particular type of access by sending a message indicating that the media playback system has been granted the particular type of access. For instance, the computing system may send respective messages over one or more networks to each media playback system. After receiving the messages, the computing systems may send requests to access the queue according to the access that they have been granted.

In other cases, the computing system may indicate that a media playback system may access the queue as authorized by a particular type of access by sending an indication of a request that the computing system carried out at request of the media playback system. For instance, the computing system may receive, from a first media playback system, a request to playback the queue, determine that the first type of access granted to the first media playback system authorizes the first media playback system to playback the queue; and send, to the first media playback system, data indicating one or more media items of the queue. In some cases, the computing system may also send data indicating respective sources of the one or more media items from which the one or more media items are playable by the first media playback system.

VI. Example Techniques to Access a Queue According to Access Control Levels

Figure 12:
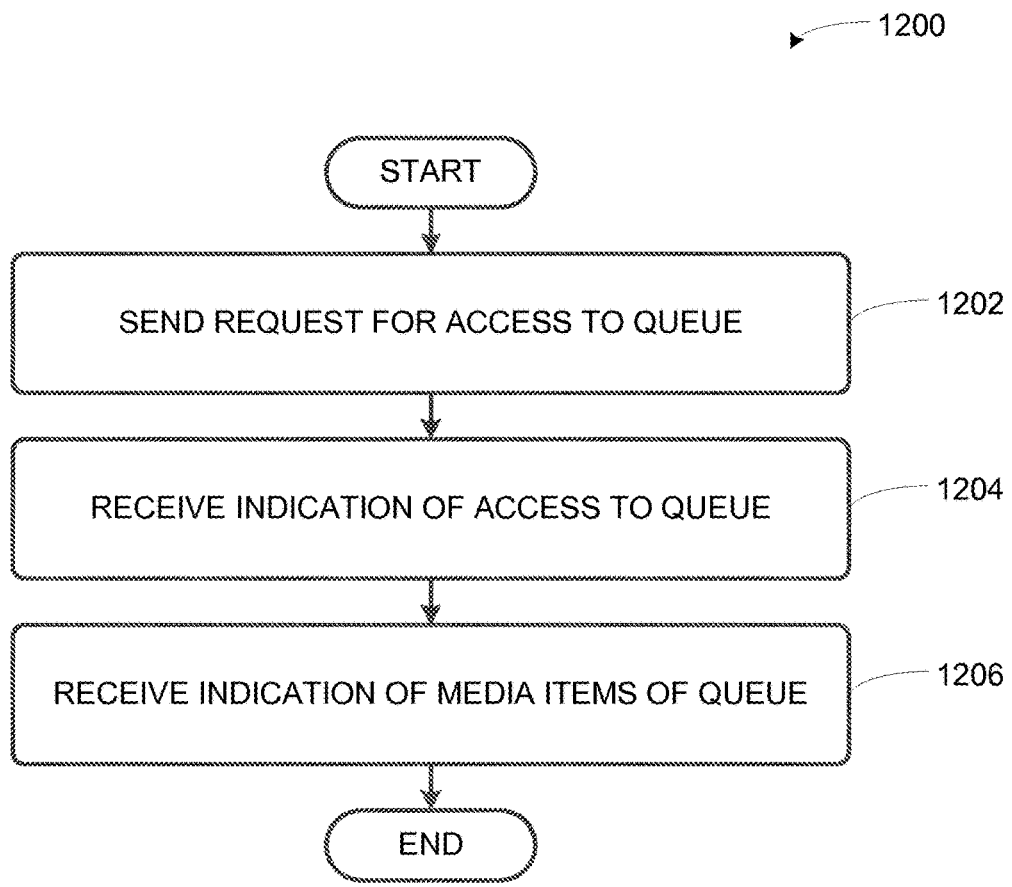
FIG. 12 is an example flow diagram to facilitate accessing a cloud queue according to one or more varying levels of access.

As noted above, embodiments described herein may involve providing varying levels of access to a cloud queue. FIG. 12 illustrates an example method to access a cloud queue using one or more varying levels of access.

a. Send Request for Access to Queue

At block 1202 of method 1200, the method involves sending a request for access to a queue of media items. A device of a media playback system (e.g., a control device or a playback device) may request to access a cloud queue of media items. For instance, the device may send a request to playback, display, or manipulate media items of the queue to a computing system that maintains or has access to a cloud queue. Many examples of access to a queue are provided herein, and other examples are possible as well. For instance, the request for access may include an authorization token.

b. Receive Indication of Access to Queue

At block 1204, the method involves receiving an indication of access to the queue. For instance, the device may receive an indication that the media playback system (or the device) may access the queue as authorized by a particular type of access (e.g., based on a user account, a particular device or type of device, or an authorization token, among other examples). As noted above, multiple types of access to a cloud queue are possible. Each type of access may permit a different set of operations with respect to the queue. In some cases, the device may receive a message indicating that the media playback system has been granted the particular type of access. Alternatively, the device may receive an indication of a request that the computing system carried out on behalf of the media playback system. Other examples are possible as well.

c. Receive Indication of Media Items of Queue

At block 1206, the method involves receiving an indication of one or more media items of the queue. For instance, a device may request an indication of one or more media items for display or playback, and receive the requested indication. Alternatively the device may request a modification to the queue, and receive an indication of the media items within the queue after the modification.

As noted above, in some cases, access to a queue may involve playback of a queue. Further, in some cases, a media playback system may playback a cloud queue based on a playhead that indicates a current media items of the queue.

During playback, a device (e.g., a playback device) may receive one or more indications of respective positions of a playhead and initiate playback of the queue in synchrony with the playhead. As noted above, multiple media playback systems may respectively play back the queue in synchrony with the playhead, so as to facilitate a joint listening experience among the media playback systems.

Figure 13:
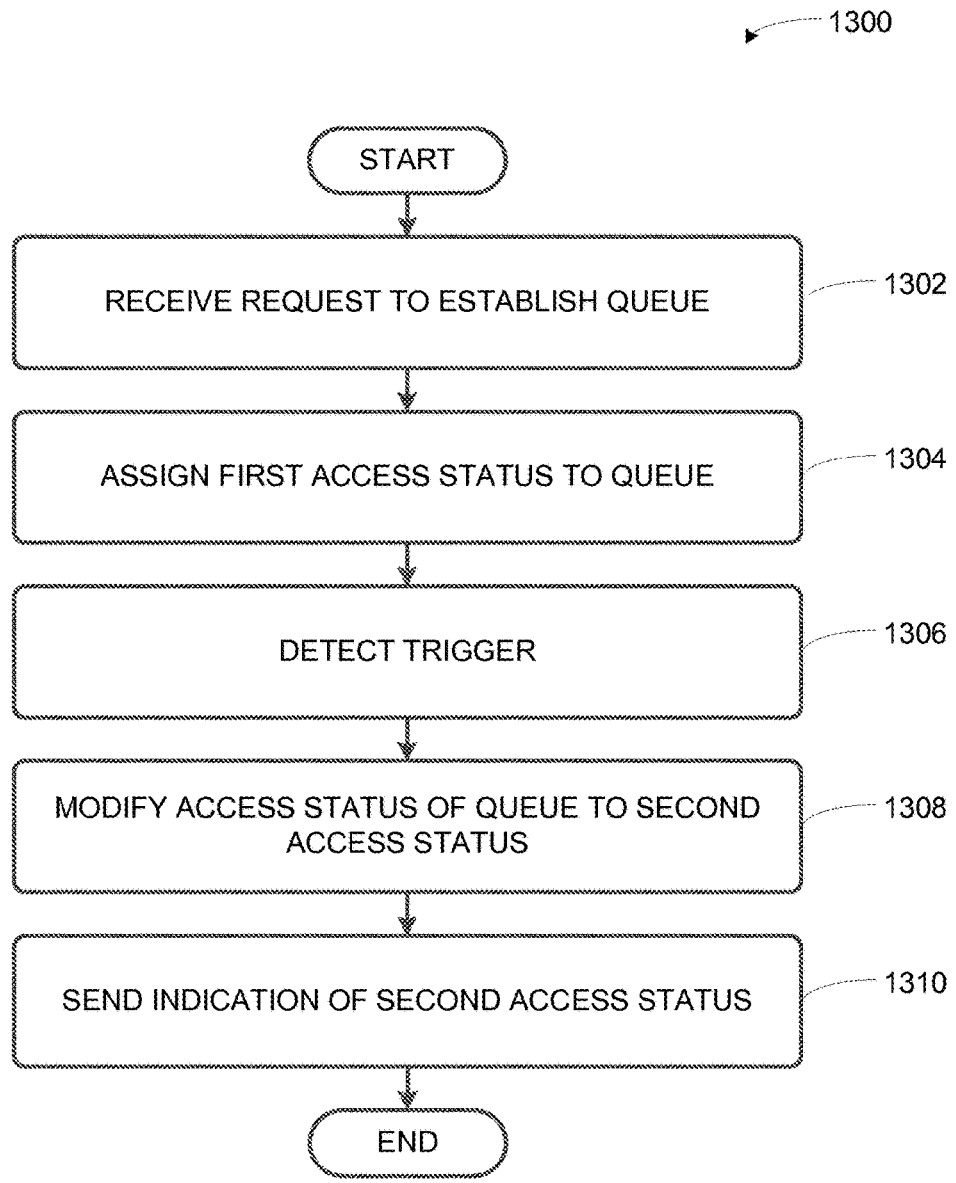
FIG. 13 is an example flow diagram to facilitate controlling access to a queue based on access statuses.

VII. Example Techniques to Control Access to a Queue According to Cloud Queue Settings As noted above, embodiments described herein may involve controlling access to a cloud queue based on various settings or properties of the cloud queue. An example computing system may maintain or have access to multiple cloud queues, each with respective properties that control access by devices to the respective cloud queue. FIG. 13 illustrates an example method that involves a cloud queue having two or more access statuses, with each access status indicating a different set of queue operations that are permitted to be performed with respect to the queue.

a. Receive Request to Establish Queue

At block 1302 of method 1300, the method involves receiving a request to establish a queue of media items. For example, a computing system may receive, from a media playback system, a request to establish a cloud queue of media items. The computing system may establish the cloud queue at the computing system itself, or may cause the cloud queue to be established at another computing system to which the computing system is communicatively coupled.

The established cloud queue may contain zero or more media items. In some cases, the computing system may receive an indication of one or more media items to insert into the established cloud queue. Alternatively, the cloud queue may be configured to include one or more media items, but not yet include any media items.

The established cloud queue may be identified by a unique identifier, such as a uniform resource identifier, to distinguish the established cloud queue from other cloud queues that the computing system may maintain or have access to. Operations performed with respect to the cloud queue may refer to the cloud queue by reference to the unique identifier.

Figure 14A:
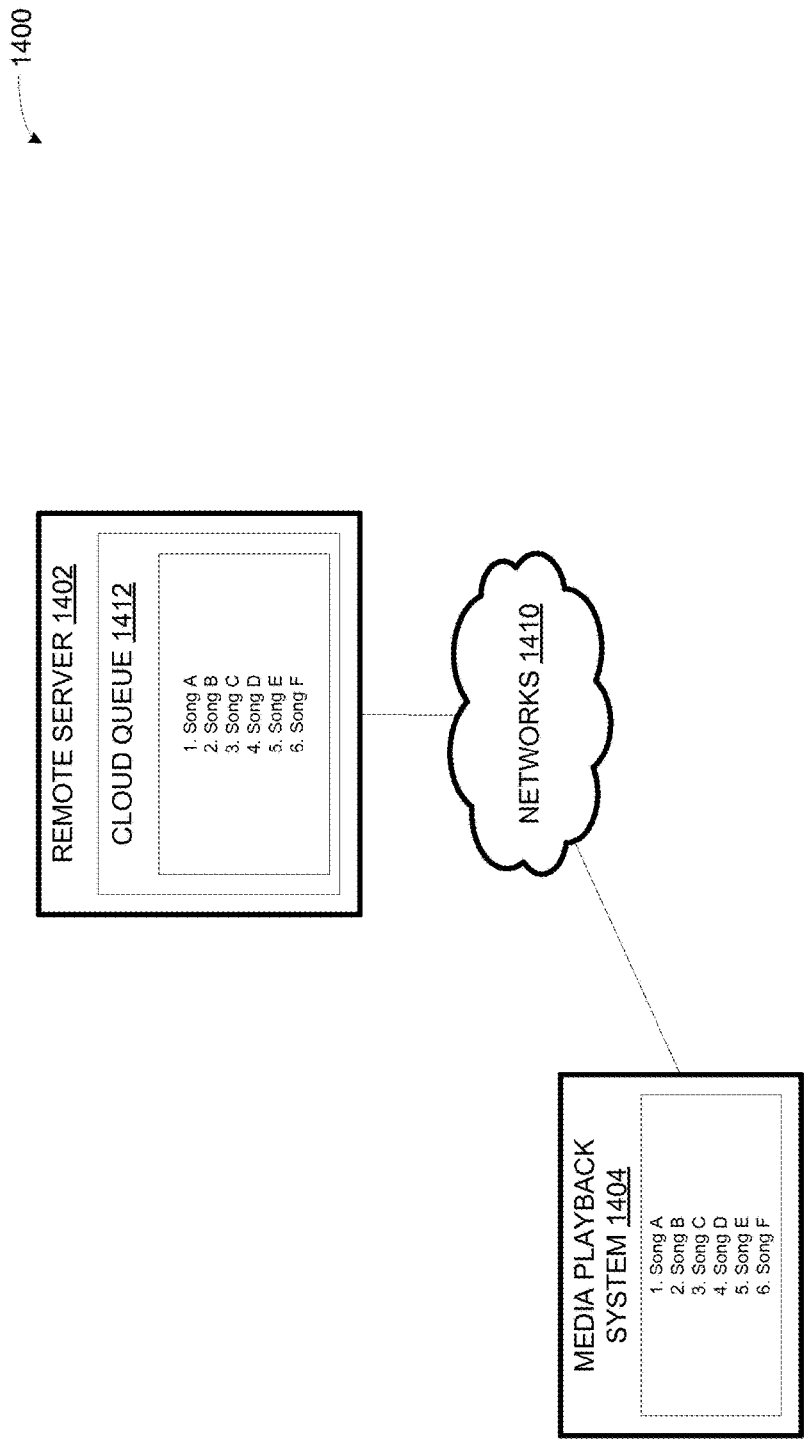
FIG. 14A is a first instance of an example environment in which certain embodiments may be practiced.

FIG. 14A illustrates an example environment 1400 that includes a remote server 1402 and a media playback system 1404 that are connected by one or more networks 1410. To establish a cloud queue, media playback system 1404 may send, via a network interface over the one or more networks 1410, a request to establish a cloud queue at remote server 1402. Upon receiving the request, remote server 1402 may establish cloud queue 1412.

After cloud queue 1412 is established, media playback systems may access cloud queue 1412. Computing devices, such as playback devices and control devices of a media playback system, as well as possibly other computing devices, may access the cloud queue by way of various operations. Many examples of operations that may be performed with respect to a cloud queue are disclosed herein, and other examples are possible as well. The media playback systems that may access the cloud queue may include those media playback systems that have been granted access. As noted above, media playback system 1102 may be granted access because media playback system 1102 established cloud queue 1412. Accessing the queue may involve establishing a local queue 1414 that is synchronized with all or part of the cloud queue 1412.

Figure 14B:
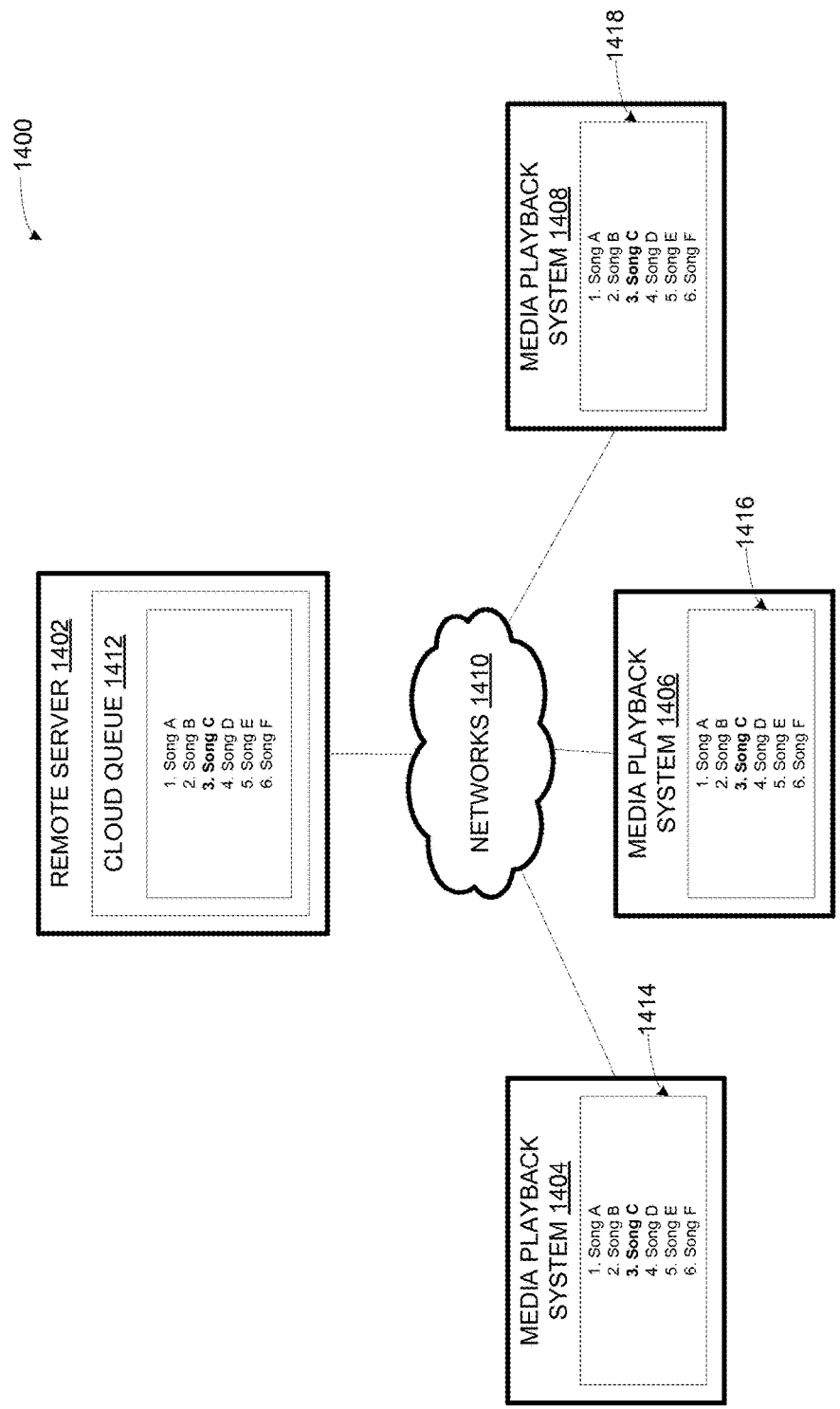
FIG. 14B is a second instance of the example environment in which certain embodiments may be practiced.

FIG. 14B further illustrates the example environment 1400. In addition to media playback system 1402, environment 1400 includes by way of example media playback systems 1406 and 1408 that are accessing cloud queue 1412, and likewise have established respective local queues 1416 and 1418 that mirror cloud queue 1412. As noted above, media playback systems 1406 and 1408 may access the cloud queue 1412 to play back the media items of the cloud queue 1412 in synchrony, among other possible features.

b. Assign First Access Status to the Queue

At block 1304, the method involves assigning a first access status to the queue. For instance, the computing system may assign a first access status to a cloud queue. An access status may indicate a set of queue operations that certain entities are permitted to perform with respect to a queue.

In some cases, the first access status might be an initial access status that is generally assigned to newly established cloud queues. Alternatively, the access status might include an access status requested for the newly established cloud queue. Referring back to FIG. 14A, remote server 1402 may assign a first access status to cloud queue 1412.

A computing system may control access to a cloud queue by way of the currently assigned access status of the cloud queue. For instance, a first access status may indicate that at least one media playback system is authorized to perform a first set of queue operations with respect to the queue. In other words, entities that are authorized to access a cloud queue (perhaps by way of a credential or authorization token) may be authorized to perform a first set of queue operations with respect to the queue, given that the queue is assigned the first access status.

A cloud queue may have a finite set of possible access statuses. In some examples, the set of access statuses' may include a first access status and a second access status. The first access status and the second access status may respectively indicate that media playback systems are authorized to perform a first set of operations and a second set of operations. While the first set of operations and the second set of operations may include some of the same operations, the sets are different from one another in that they do not include the same set of operations.

In some cases, the first set of queue operations might include playback of the cloud queue (and the second set of operations might not include playback). In operation, a media playback system may initiate playback of the cloud queue. For instance, media playback system 1404 of FIG. 14 may initiate playback of cloud queue 1412 on one or more playback devices of media playback system 1402. Remote server 1402 may receive, from media playback system 1404, a request for an indication of one or more media items from queue 1412 for playback. Such a request may be used to synchronize local queue 1414 with cloud queue 1412. Remote server 1402 may determine that the queue is assigned the first access status such that media playback systems are authorized to play back cloud queue 1412, and, based on such a determination, send an indication of the one or more media items from the queue to media playback system 1404 and may also send an indication of respective sources from which media playback system 1104 can retrieve the one or more media items.

In some cases, the first set of queue operations might include modification of the queue (and the second set of operations might not include modification). Media playback system 1404 of FIG. 14 may request to modify cloud queue 1412 on one or more playback devices of media playback system 1402 by sending a request to remote server 1402. For instance, remote server 1402 may receive a request to modify cloud queue 1412 by inserting one or more additional media items into the queue. Remote server 1402 may determine that the queue is assigned the first access status such that media playback systems are authorized to modify the queue, and based on the determination, modify the queue according to the request and send an indication of the one or more additional media items to media playback system 1404 (and perhaps also media playback systems 1406 and 1408).

In some embodiments, a cloud queue may have a finite "lifespan." The cloud queue may expire upon certain conditions. In such an embodiment, the first access status may be assigned to a cloud queue during its lifespan and the second access status may be assigned to a cloud queue that has reached "end-of-life" or expired.

c. Detect a Trigger

At block 1306, the method involves detecting a trigger that indicates a change in access status of the queue. For instance, remote server 1402 of FIG. 14B may detect a trigger that indicates a change in access status of cloud queue 1412. As noted above, in some embodiments, a cloud queue may have a finite "lifespan" and the trigger may indicate the "end-of-life" of the cloud queue. In various embodiments, the trigger may correspond to different conditions.

In some embodiments, the trigger may occur based on a threshold duration of time. For instance, the trigger may occur based on a threshold duration of time elapsing from a certain reference event. Reference events may include the establishment of the queue, or perhaps the last instance on which the queue was played back. In such an example, detecting the trigger may involve determining that a threshold duration of time has elapsed since the reference event occurred (e.g., since the queue was established). Alternatively, a cloud queue may be limited to a particular duration of playback time before reaching end-of-life. For example, detecting the trigger may involve determining that the duration of time that the queue has been played back exceeds a threshold duration. In this example, the reference event may include an initiation of playback of the queue.

The trigger may be based on other conditions related to the extent of access to the queue. For example, detecting the trigger may involve determining that one or more media playback systems have played back the media items of the queue on more than a threshold number of occasions. Within examples, each media item may be limited to a certain threshold number of plays, or the media items of the queue may be limited to a combined threshold (e.g., 500 plays). Alternatively, detecting the trigger may involve determining that a threshold number of media playback systems have accessed the queue, or perhaps that the queue has been accessed on a threshold number of occasions.

In some cases, the trigger may correspond to licensing restrictions of the media items within the cloud queue. The computing system may receive data that indicates respective licensing restrictions for each of the media items within the queue, and identify the trigger based on such data. For instance, media items from a particular label may be restricted to five plays per week. To comply with such a restriction, the computing system may change the access status of the queue after reaching such a threshold.

d. Modify the Access Status of the Queue to Second Access Status

At block 1308, the method involves modifying the access status of the queue from the first access status to a second access status. For instance, a computing system may modify the access status based on detecting the trigger that indicates the change in access status (e.g., upon detecting the trigger). As noted above, the second access status indicates that media playback systems are authorized to perform a second set of queue operations. The second set of operations may include fewer operations, or include operations that involve a lesser extent of access.

For example, the second set of operations might include playback of the queue, but might not include modification of the queue (which might be included within the first set of operations). Referring back to FIG. 14B, remote server 1402 may change the access status of cloud queue 1412 from a first access status to a second access status. Thereafter, remote server 1402 may receive a request from media playback system 1404 to modify cloud queue 1412 (such as by including one or more additional media items in the queue, deleting items from the queue, or re-ordering items within the queue). Remote server 1402 may determine that the cloud queue 1412 is assigned the second access status such that media playback systems are unauthorized to modify the queue, and, rather than modifying cloud queue 1412, send to media playback system 1404 an indication that media playback systems are not authorized to modify the queue.

As another example, the second set of operations might include playback of a subset of the queue. For instance, some of the media items of the queue might be limited by licensing or other restrictions, while other items might not be restricted. To illustrate, remote server 1402 may receive, from media playback system 1406, a request for an indication of one or more media items from cloud queue 1412 for playback. Remote server 1402 may determine that cloud queue 1412 is assigned the second access status such that media playback systems are authorized to playback a subset of the queue. Remote server 1402 may identify media items that are included in the subset, and send an indication of the identified media items to media playback system 1406.

Other combinations of operations are possible as well. As a further example, the second set of operations might include display of the queue (and might not include playback or modification of the queue), such that the queue is only available for viewing. As noted above, a control device of a media playback system may cause a graphical interface to display an indication of a cloud queue, which might include an indication of the media items of the cloud queue, and perhaps the ordering of the media items as well. Such display may be authorized under some access status but not others. As another example, the second set of operations might exclude playback.

e. Send Indication of Second Access Status

At block 1310, the method involves sending an indication of the second access status to a media playback system. For instance, referring back to FIG. 14B, remote server 1402 may send an indication of the second access status of cloud queue 1412 to media playback system 1404 (and perhaps also media playback systems 1404 and 1408). Upon receiving the indication of the second access status, access to cloud queue 1412 may be limited to the second set of operations.

In some cases, receiving the indication of the second access status may cause deletion (i.e., removal) of the local copies of the cloud queues. For instance, remote server 1402 may send an indication of the second access status of cloud queue 1412 to media playback systems 1404, 1406, and 1408, which may cause deletion of local queues 1414, 1416, and 1418. More particularly, the indication may include instructions that cause the local queue removal.

In some cases, the indication of the second access status may be based on a requested operation. For instance, upon receiving a request to perform an operation, the computing system may determine whether the assigned access status of the queue indicates that such an operation is authorized, and responsively permit or deny the request to perform the operation. In permitting the request, the computing system may carry out the requested operation and send an indication of the operation to the requesting media playback system. In denying the request, the computing system may send an indication that such an operation is not authorized, or perhaps that the queue is assigned a particular status under which the operation is not permitted.

In some embodiments, the access status of a queue may be modified from the second access status back to the first access status. For example, a cloud queue that has expired may be revived, perhaps under certain conditions. If the access status of a queue can be modified, the media playback systems may receive an indication that the access status may be modified. Such media playback systems may request to modify the access status, perhaps based on detecting input data that requests access to the queue. Upon receiving such a request, the media playback system may determine whether such a request is authorized, perhaps based on the licensing data noted above, and modify the access status, given that such an operation is authorized.

Figure 15:
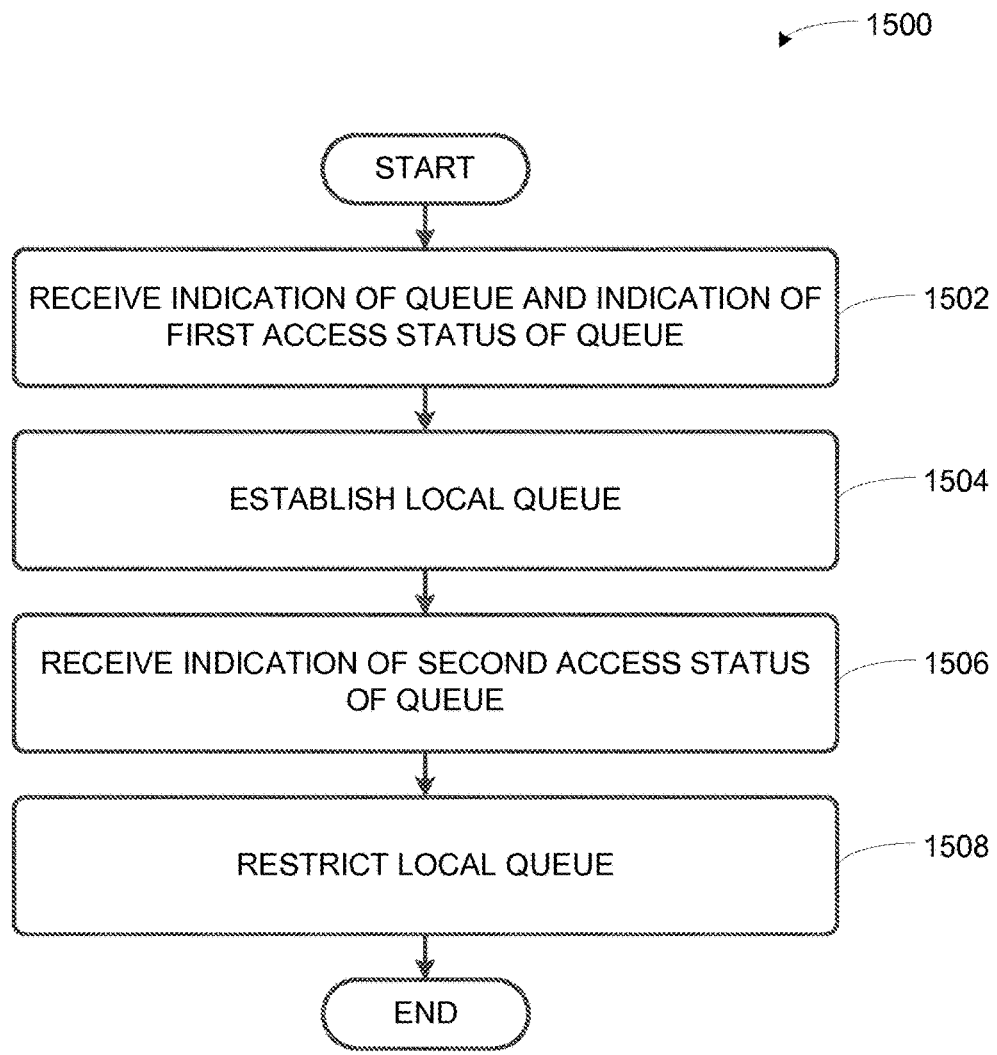
FIG. 15 is an example flow diagram to facilitate access to a queue based on access statuses.

VIII. Example Techniques to Control Access to a Local Queue According to Cloud Queue Settings As noted above, embodiments described herein may involve controlling access to a cloud queue based on various settings or properties of the cloud queue. FIG. 15 illustrates an example method 1500 that involves a cloud queue that has two or more access statuses, with each access status indicating a different set of queue operations that are permitted to be performed with respect to the local queue that is associated with the cloud queue. The local queue may be a local instance (or copy) of a cloud queue.

a. Receive Indication of Queue and First Access Status of Queue

At block 1502 of method 1500, the method involves receiving an indication of a queue of media items, and an indication that the queue has a first access status. For instance, referring to FIG. 14B, a device of media playback system 1404 (e.g., an instance of a playback device 200 or a control device 300) may receive an indication of cloud queue 1412, and an indication that cloud queue 1412 has a first access status. As noted above, the first access status may indicate that the playback device is authorized to perform a first set of queue operations, such as the operations noted above.

b. Establish Local Queue

At block 1504, the method involves establishing a local queue. For instance, a playback device of media playback system 1404 may establish local queue 1414, which may be a local instance of cloud queue 1412 that includes the media items indicated in cloud queue 1412. In some cases, the local instance may include a subset of media items from cloud queue 1412. The subset might include a sequence of one or more media items that includes a media item that is designated as the currently playing media item, perhaps by way of a playhead.

c. Receive Indication of Second Access Status of Queue

At block 1506, the method involves receiving an indication that the queue has been assigned a second access status. For instance, the playback device of media playback system 1404 may receive an indication that cloud queue 1402 has been assigned a second access status. As noted above, the second access status may indicate that the playback device of the media playback system 1404 is authorized to perform a second set of operations. The second access status may indicate that the queue has expired (i.e., reached end-of-life) and accordingly is available only for a limited set of operations compared to the operations available during its lifetime.

d. Restrict Local Queue to Second Set of Queue Operations

At block 1508, the method involves restricting the local queue to the second set of operations. For instance, the playback device of media playback system 1404 may restrict local queue 1414 to the second set of operations. In operation, the playback device may receive requests to perform operations with respect to the local queue and/or the cloud queue, perhaps from a control device. Upon receiving a request, the playback device may determine whether the requested operations is within the second set of operations, and carry out the operation given that the operation is authorized.

The playback device may also send an indication of the second access status to other devices of the media playback system 1404, such as one or more additional playback devices and perhaps one or more control devices. This may distribute the status of the cloud queue among devices of the media playback system 1404. In some cases, the media playback system 1404 may delete local queue 1414. For instance, each device of the media playback system may delete data related to the cloud queue, perhaps based on receiving the indication of the second access status.

As noted above, after the local queue is restricted, the media playback system 1404 may perform the second set of operations. The second set of operations may be a limited set of operations as compared to the first set of operations. For instance, playback of the queue may be limited to a subset of media items, or to display of the queue, among other examples.

IV. Example Techniques to Display Cloud Queue Settings

Figure 16:
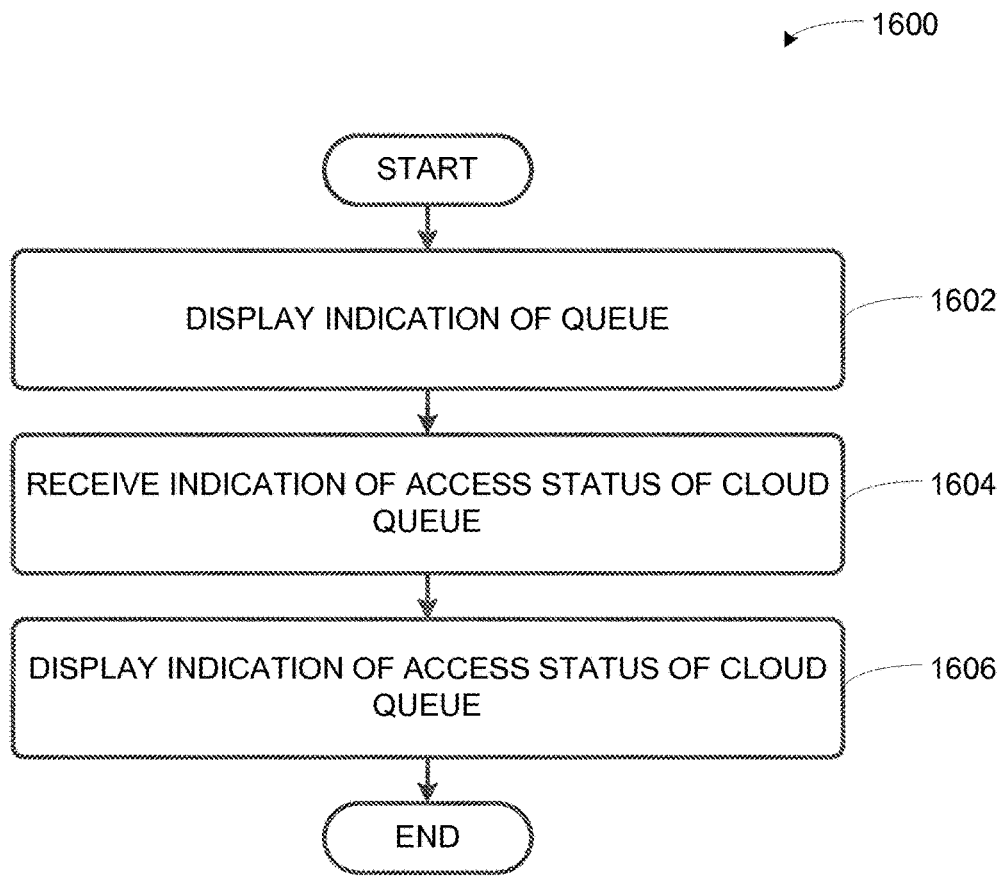
FIG. 16 is an example flow diagram to display an indication of an access status of a cloud queue.

FIG. 16 shows an example method 1600 that involves display of cloud queue access settings.

a. Display Indication of Cloud Queue

At block 1602 of method 1600, a control device of a media playback system may display a controller interface, such as controller interface 400 of FIG. 4. The controller interface may include an indication of one or more cloud queues that the media playback system is currently accessing or has accessed. For instance, the controller interface may display a cloud queue that the media playback system is currently accessing (i.e., an "active" queue) in a playback queue region, such as the playback queue region 440 of FIG. 4. In some cases, the controller interface may include an indication of other cloud queues and/or local queues that the media playback system has established or accessed. The interface may also include controls for playback and/or modification of the cloud queue.

b. Receive Indication of Queue Access Status

At block 1604, the method involves receiving an indication of the access status of the queue. For instance, the control device may receive an indication of the access status of the cloud queue from a playback device of the media playback system, or perhaps from a remote server that maintains or has access to the cloud queue. The control device may periodically receive an indication of the access status, or may receive an indication of the access status upon the access status changing.

In some embodiments, receiving the access status may involve receiving an indication of the "lifetime" remaining until a trigger event occurs that changes the access status. As noted above, a remote server may modify the access status of a cloud queue based on a trigger. Further, the trigger may relate to various thresholds that relate to the extent of queue access that has occurred. During the lifetime of the queue, the controller device may receive one or more indications of the amount of lifetime left before the trigger threshold is reached. For instance, the control device may receive an indication of the amount of time remaining until a threshold duration of time has elapsed. As another example, the control device may receive an indication of the number of plays that are remaining before a threshold number of plays are reached. Other examples are possible as well.

c. Display Indication of Queue Access Status

At block 1606, the method involves causing a graphical interface to display an indication of the access status of a cloud queue. In some embodiments, a controller interface may include an indication of the access status (e.g., whether a cloud queue has a first access status or a second access status). For instance, the controller interface may indicate that the cloud queue is limited by a lifetime, or that the cloud queue has expired (e.g., reached end-of-life). Upon a queue reaching end-of-life, the controller interface may indicate that the cloud queue is limited to certain operations (i.e., the second set of operations). The control device may display controls of the controller interface that are operable to perform operations that are not within the second set of operations. The controller interface may change visually to indicate that certain controls or items are unavailable, such as by changing the color or appearance of the unavailable items.

As noted above, a remote server may modify the access status of a cloud queue based on a trigger. Further, the trigger may relate to various thresholds that relate to the extent of queue access that has occurred. During the lifetime of the queue, the controller interface may include an indication of the amount of lifetime left before the trigger threshold is reached. For instance, the controller interface may include an indication of the amount of time remaining until a threshold duration of time has elapsed. As another example, the controller interface may show a progress bar or other indicator that shows how many plays are remaining before a threshold number of plays are reached. Other example indications to show the remaining lifetime of the queue are possible as well.

X. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, example techniques may involve controlling access to a cloud queue based on an authorization token. In one aspect, a method is provided. The method may involve obtaining an authorization token corresponding to a particular queue of media items at a remote server. The method may also involve sending (i) the obtained authorization token, and (ii) a request for access to one or more media items of the particular queue. The method may further involve receiving an indication that the media playback system may access the one or more media items.

In another aspect, a device is provided. The device includes a network interface, at least one processor, a data storage, and program logic stored in the data storage and executable by the at least one processor to perform functions. The functions may include obtaining an authorization token corresponding to a particular queue of media items at a remote server. The functions may also include sending (i) the obtained authorization token, and (ii) a request for access to one or more media items of the particular queue. The functions may further include receiving an indication that the media playback system may access the one or more media items.

In yet another aspect, a non-transitory computer readable memory is provided. The non-transitory computer readable memory has stored thereon instructions executable by a computing device to cause the computing device to perform functions. The functions may include obtaining an authorization token corresponding to a particular queue of media items at a remote server. The functions may also include sending (i) the obtained authorization token, and (ii) a request for access to one or more media items of the particular queue. The functions may further include receiving an indication that the media playback system may access the one or more media items.

In yet another aspect, another method is provided. The method may involve receiving (i) an authorization token associated with a particular media playback system, and (ii) a request for access by the media playback system to a queue of media items. The method may also involve determining the access to the queue that the authorization token authenticates to the media playback system. The method may further involve providing, the media playback system the access to the media items that the authorization token authenticates to the media playback system.

In another aspect, a device is provided. The device includes a network interface, at least one processor, a data storage, and program logic stored in the data storage and executable by the at least one processor to perform functions. The functions may include receiving (i) an authorization token associated with a particular media playback system, and (ii) a request for access by the media playback system to a queue of media items. The functions may also include determining the access to the queue that the authorization token authenticates to the media playback system. The functions may further include providing, the media playback system the access to the media items that the authorization token authenticates to the media playback system.

In yet another aspect, a non-transitory computer readable memory is provided. The non-transitory computer readable memory has stored thereon instructions executable by a computing device to cause the computing device to perform functions. The functions may include receiving (i) an authorization token associated with a particular media playback system, and (ii) a request for access by the media playback system to a queue of media items. The functions may also include determining the access to the queue that the authorization token authenticates to the media playback system. The functions may further include providing, the media playback system the access to the media items that the authorization token authenticates to the media playback system.

Also as indicated above, example techniques may involve granting entities respective types of access. In one aspect, a method is provided. The method may involve receiving (i) a request from a first media playback system for access to a queue of media items, and (ii) a request from a second media playback system for access to the queue of media items. The method may also involve granting (i) a first type of access to the first media playback system, and (ii) a second type of access to the second media playback system. The first type of access may authorize the first media playback system to perform a first set of operations on the queue of media items and a second type of access may authorize the second media playback system to perform a second set of operations on the queue of media items that is different from the first set of operations. The method may further involve providing (i) an indication that the first media playback system may access the queue as authorized by the first type of access, and (ii) an indication that the second media playback system may access the queue as authorized by the second type of access.

In another aspect, a device is provided. The device includes a network interface, at least one processor, a data storage, and program logic stored in the data storage and executable by the at least one processor to perform functions. The functions may include receiving (i) respective requests from a plurality of first media playback systems for respective access to a queue of media items, and (ii) a request from a second media playback system for access to the queue of media items. The functions may also include granting (i) a first type of access to the first media playback systems and (ii) a second type of access to the second media playback system. The first type of access may authorize the first media playback system to perform a first set of operations on the queue of media items and a second type of access may authorize the second media playback system to perform a second set of operations on the queue of media items that is different from the first set of operations. The functions may further include providing (i) the first media playback systems access to the queue as authorized by the first type of access rights, and (ii) the second media playback system access to the queue as authorized by the second type of access rights.

In yet another aspect, a non-transitory computer readable memory is provided. The non-transitory computer readable memory has stored thereon instructions executable by a computing device to cause the computing device to perform functions. The functions may include receiving (i) respective requests from a plurality of first media playback systems for respective access to a queue of media items, and (ii) a request from a second media playback system for access to the queue of media items. The functions may also include granting (i) a first type of access to the first media playback systems and (ii) a second type of access to the second media playback system. The first type of access may authorize the first media playback system to perform a first set of operations on the queue of media items and a second type of access may authorize the second media playback system to perform a second set of operations on the queue of media items that is different from the first set of operations. The functions may further include providing (i) the first media playback systems access to the queue as authorized by the first type of access rights, and (ii) the second media playback system access to the queue as authorized by the second type of access rights.

In yet another aspect, another method is provided. The method may involve sending a request for access to a queue of media items. The method may also involve receiving an indication that the media playback system may access the queue as authorized by a first type of access. The first type of access may authorize the first media playback system to perform a first set of operations on the queue of media items and a second type of access may authorize the second media playback system to perform a second set of operations on the queue of media items that is different from the first set of operations. The method may further involve receiving an indication of one or more media items of the queue.

In another aspect, a device is provided. The device includes a network interface, at least one processor, a data storage, and program logic stored in the data storage and executable by the at least one processor to perform functions. The functions may include sending a request for access to a queue of media items. The functions may also include receiving an indication that the media playback system may access the queue as authorized by a first type of access. The first type of access may authorize the first media playback system to perform a first set of operations on the queue of media items and a second type of access may authorize the second media playback system to perform a second set of operations on the queue of media items that is different from the first set of operations. The functions may further include receiving an indication of one or more media items of the queue.

In yet another aspect, a non-transitory computer readable memory is provided. The non-transitory computer readable memory has stored thereon instructions executable by a computing device to cause the computing device to perform functions. The functions may include sending a request for access to a queue of media items. The functions may also include receiving an indication that the media playback system may access the queue as authorized by a first type of access. The first type of access may authorize the first media playback system to perform a first set of operations on the queue of media items and a second type of access may authorize the second media playback system to perform a second set of operations on the queue of media items that is different from the first set of operations. The functions may further include receiving an indication of one or more media items of the queue.

As further indicated above, example techniques may involve controlling access to a cloud queue based on a configuration or settings of the cloud queue itself. In one aspect, a method is provided. The method may involve receiving a request to establish a queue of media items. The method may also involve assigning a first access status to the queue. The first access status may indicate that at least one media playback system is authorized to perform a first set of queue operations. After assigning the first access status to the queue, the method may involve detecting a trigger that indicates a change in access status of the queue. Based on the detected trigger, the method may involve modifying the access status of the queue from the first access status to a second access status. The second access status may indicate that the at least one media playback system is authorized to perform a second set of queue operations that is different from the first set of queue operations. The method may also involve sending an indication of the second access status to a media playback system.

In another aspect, a device is provided. The device includes a network interface, at least one processor, a data storage, and program logic stored in the data storage and executable by the at least one processor to perform functions. The functions may include receiving a request to establish a queue of media items. The functions may also include assigning a first access status to the queue. The first access status may indicate that at least one media playback system is authorized to perform a first set of queue operations. After assigning the first access status to the queue, the functions may include detecting a trigger that indicates a change in access status of the queue. The functions may include modifying the access status of the queue from the first access status to a second access status based on the detected trigger. The second access status may indicate that the at least one media playback system is authorized to perform a second set of queue operations that is different from the first set of queue operations. The functions may also include sending an indication of the second access status to a media playback system.

In yet another aspect, a non-transitory computer readable memory is provided. The non-transitory computer readable memory has stored thereon instructions executable by a computing device to cause the computing device to perform functions. The functions may include receiving a request to establish a queue of media items. The functions may also include assigning a first access status to the queue. The first access status may indicate that at least one media playback system is authorized to perform a first set of queue operations. After assigning the first access status to the queue, the functions may include detecting a trigger that indicates a change in access status of the queue. The functions may include modifying the access status of the queue from the first access status to a second access status based on the detected trigger. The second access status may indicate that the at least one media playback system is authorized to perform a second set of queue operations that is different from the first set of queue operations. The functions may also include sending an indication of the second access status to a media playback system.

In yet another aspect, another method is provided. The method may involve receiving (i) an indication of a queue of media items, and (ii) an indication that the queue has a first access status. The first access status may indicate that the playback device is authorized to perform a first set of queue operations. The method may also involve establishing a local instance of the queue. The method may further involve receiving an indication that the queue has been assigned a second access status. The second access status may indicate that the playback device is authorized to perform a second set of queue operations that is different from the first set of queue operations. The method may involve restricting the local instance of the queue to the second set of queue operations.

In another aspect, a device is provided. The device includes a network interface, at least one processor, a data storage, and program logic stored in the data storage and executable by the at least one processor to perform functions. The functions may include receiving (i) an indication of a queue of media items, and (ii) an indication that the queue has a first access status. The first access status may indicate that the playback device is authorized to perform a first set of queue operations. The functions may also include establishing a local instance of the queue. The functions may further include receiving an indication that the queue has been assigned a second access status. The second access status may indicate that the playback device is authorized to perform a second set of queue operations that is different from the first set of queue operations. The functions may include restricting the local instance of the queue to the second set of queue operations.

In yet another aspect, a non-transitory computer readable memory is provided. The non-transitory computer readable memory has stored thereon instructions executable by a computing device to cause the computing device to perform functions. The functions may include receiving (i) an indication of a queue of media items, and (ii) an indication that the queue has a first access status. The first access status may indicate that the playback device is authorized to perform a first set of queue operations. The functions may also include establishing a local instance of the queue. The functions may further include receiving an indication that the queue has been assigned a second access status. The second access status may indicate that the playback device is authorized to perform a second set of queue operations that is different from the first set of queue operations. The functions may include restricting the local instance of the queue to the second set of queue operations.

In another aspect, a method is provided. The method may involve displaying an indication of a queue on a graphical interface. The method may further involve receiving an indication of an access status of the queue. The method may also involve displaying an indication of the access status of the queue.

In another aspect, a device is provided. The device includes a network interface, at least one processor, a data storage, and program logic stored in the data storage and executable by the at least one processor to perform functions. The functions may include displaying an indication of a queue on a graphical interface. The functions may further include receiving an indication of an access status of the queue. The functions may also include displaying an indication of the access status of the queue.

In yet another aspect, a non-transitory computer readable memory is provided. The non-transitory computer readable memory has stored thereon instructions executable by a computing device to cause the computing device to perform functions. The functions may include displaying an indication of a queue on a graphical interface. The functions may further include receiving an indication of an access status of the queue. The functions may also include displaying an indication of the access status of the queue.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A tangible, non-transitory computer-readable medium storing instructions that when executed by one or more processors cause a computing system to perform functions comprising:
receiving, over a network interface from a media playback system, an authorization token corresponding to a cloud queue of media items at the computing system and a request by the media playback system for access to the cloud queue of media items, wherein the media playback system is remote from the computing system;
determining that the authorization token is valid;
in response to determining that the authorization token is valid, providing, to the media playback system, the requested access to the cloud queue of media items, the providing comprising transmitting information associated with a window of media items from the cloud queue to cause the window of media items from the cloud queue to be queued in a local queue at the media playback system, the window of media items including a particular media item corresponding to a position of a playhead and at least one additional media item subsequent to the particular media item;
determining that the media playback system is eligible for a renewed authorization token; and
in response to determining that the media playback system is eligible for the renewed authorization token, transmitting, to the media playback system, the renewed authorization token.

2. The tangible, non-transitory computer-readable medium of claim 1, wherein the authorization token is a first authorization token, wherein the cloud queue is a first cloud queue, wherein the renewed authorization token is a renewed first authorization token, and wherein the functions further comprise:
receiving, over the network interface from the media playback system, a second authorization token corresponding to a second cloud queue of media items;
determining that the second authorization token is expired; and
in response to determining that the second authorization token is expired, transmitting, to the media playback system, an indication that the second authorization token is expired.

3. The tangible, non-transitory computer-readable medium of claim 2, wherein the functions further comprise:
receiving, over the network interface from the media playback system, a request for a renewed second authorization token;
determining that the media playback system is eligible for the renewed second authorization token; and
transmitting, over the network interface to the media playback system, the renewed second authorization token corresponding to the second cloud queue of media items.

4. The tangible, non-transitory computer-readable medium of claim 3, wherein the functions further comprise:
receiving, over the network interface from the media playback system, the renewed second authorization token corresponding to the second cloud queue of media items and a second request for access by the media playback system to the second cloud queue of media items;
determining that the renewed second authorization token is valid; and
providing, to the media playback system, the requested access to the second cloud queue of media items.

5. The tangible, non-transitory computer-readable medium of claim 1, wherein the functions further comprise:
receiving, over the network interface from the media playback system, playback data, and
wherein determining that the media playback system is eligible for the renewed authorization token comprises determining that the media playback system is eligible for the renewed authorization token based on the playback data.

6. The tangible, non-transitory computer-readable medium of claim 1, wherein determining that the authorization token is valid comprises:
determining that the cloud queue has been played back for less than a threshold duration of time.

7. The tangible, non-transitory computer-readable medium of claim 1, wherein the authorization token is associated with a set of access rights, wherein set of access rights associated with the authorization token comprise playback rights that permit playback of the media items of the cloud queue.

8. A method comprising:
receiving, via a computing system over a network interface from a media playback system, an authorization token corresponding to a cloud queue of media items at the computing system and a request by the media playback system for access to the cloud queue of media items, wherein the computing system is remote from the media playback system;
determining, via the computing system, that the authorization token is valid;
in response to determining that the authorization token is valid, providing, via the computing system to the media playback system, the requested access of the cloud queue of media items, the providing comprising transmitting information associated with a window of media items from the cloud queue to cause the window of media items from the cloud queue to be queued in a local queue at the media playback system, the window of media items including a particular media item corresponding to a position of a playhead and at least one additional media item subsequent to the particular media item;
determining that the media playback system is eligible for a renewed authorization token; and
in response to determining that the media playback system is eligible for the renewed authorization token, transmitting, via the computing system to the media playback system, the renewed authorization token.

9. The method of claim 8, wherein the authorization token is a first authorization token, wherein the cloud queue is a first cloud queue, wherein the renewed authorization token is a renewed first authorization token, and wherein the method further comprises:
receiving, via the computing system over the network interface from the media playback system, a second authorization token corresponding to a second cloud queue of media items;
determining, via the computing system, that the second authorization token is expired; and
in response to determining that the second authorization token is expired, transmitting, via the computing system to the media playback system, an indication that the second authorization token is expired.

10. The method of claim 9, further comprising:
receiving, via the computing system over the network interface from the media playback system, a request for a renewed second authorization token;

determining, via the computing system, that the media playback system is eligible for the renewed second authorization token; and transmitting, via the computing system over the network interface to the media playback system, the renewed second authorization token.

11. The method of claim 10, further comprising:

receiving, via the computing system over the network interface from the media playback system, the renewed second authorization token corresponding to the second cloud queue of media items and a second request for access by the media playback system to the second cloud queue of media items;

determining, via the computing system, that the renewed second authorization token is valid; and providing, via the computing system to the media playback system the requested access to the second cloud queue of media items.

12. The method of claim 8, further comprising:

receiving, via the computing system over the network interface from the media playback system, playback data, and wherein determining that the media playback system is eligible for the renewed authorization token comprises determining that the media playback system is eligible for the renewed authorization token based on the playback data.

13. The method of claim 8, wherein determining that the authorization token is valid comprises:

determining that the cloud queue has been played back for less than a threshold duration of time.

14. The method of claim 8, wherein the authorization token is associated with a set of access rights, wherein set of access rights associated with the authorization token comprise playback rights that permit playback of the media items of the cloud queue.

15. A computing system comprising:

one or more processors; and one or more computer readable mediums storing instructions that when executed by the one or more processors cause the computing system to perform functions comprising:

receiving, over a network interface from a media playback system, an authorization token corresponding to a cloud queue of media items at the computing system and a request by the media playback system for access to the cloud queue of media items, wherein the computing system is remote from the media playback system;

determining that the authorization token is valid;

in response to determining that the authorization token is valid, providing, to the media playback system, the requested access of the cloud queue of media items, the providing comprising transmitting information associated with a window of media items from the cloud queue to cause the window of media items from the cloud queue to be queued in a local queue at the media playback system, the window of media items including a particular media item corresponding to a position of a playhead and at least one additional media item subsequent to the particular media item;

determining that the media playback system is eligible for a renewed authorization token; and in response to determining that the media playback system is eligible for the renewed authorization token, transmitting, to the media playback system, the renewed authorization token.

16. The computing system of claim 15, wherein the authorization token is a first authorization token, wherein the cloud queue is a first cloud queue, wherein the renewed authorization token is a renewed first authorization token, and wherein the functions further comprise:

receiving, over the network interface from the media playback system, a second authorization token corresponding to a second cloud queue of media items;

determining that the second authorization token is expired; and in response to determining that the second authorization token is expired, transmitting, to the media playback system, an indication that the second authorization token is expired.

17. The computing system of claim 16, wherein the functions further comprise:

receiving, over the network interface from the media playback system, a request for a renewed second authorization token;

determining that the media playback system is eligible for the renewed second authorization token; and transmitting, over the network interface to the media playback system, the renewed second authorization token.

18. The computing system of claim 17, wherein the functions further comprise:

receiving, over the network interface from the media playback system, the renewed second authorization token corresponding to the second cloud queue of media items and a second request for access by the media playback system to the second cloud queue of media items;

determining that the renewed second authorization token is valid; and providing, to the media playback system the requested access to the second cloud queue of media items.

19. The computing system of claim 15, wherein the functions further comprise:

receiving, over the network interface from the media playback system, playback data, and wherein determining that the media playback system is eligible for the renewed authorization token comprises determining that the media playback system is eligible for the renewed authorization token based on the playback data.

20. The computing system of claim 15, wherein determining that the authorization token is valid comprises:

determining that the cloud queue has been played back for less than a threshold duration of time.

* * * * *